(12) United States Patent
Burtov et al.

(10) Patent No.: US 10,076,954 B2
(45) Date of Patent: Sep. 18, 2018

(54) SELF-POWERED PLANETARY ORBITAL WHEEL ASSEMBLIES

(71) Applicant: GeoOrbital Inc., Swampscott, MA (US)

(72) Inventors: Michael Burtov, Swampscott, MA (US); Dakota Decker, Somerville, MA (US); Gideon Coltof, Brookline, MA (US)

(73) Assignee: Geo Orbital Inc., Swampscott, MA (US)

( * ) Notice: Subject to any disclaimer, the term of this patent is extended or adjusted under 35 U.S.C. 154(b) by 80 days.

(21) Appl. No.: 14/843,706

(22) Filed: Sep. 2, 2015

(65) Prior Publication Data

US 2016/0068056 A1 Mar. 10, 2016

Related U.S. Application Data

(60) Provisional application No. 62/045,368, filed on Sep. 3, 2014, provisional application No. 62/077,491, filed on Nov. 10, 2014.

(51) Int. Cl.
| | |
|---|---|
| *B62M 6/75* | (2010.01) |
| *B60K 7/00* | (2006.01) |
| *B60K 1/02* | (2006.01) |
| *B60K 1/04* | (2006.01) |
| *B62M 6/60* | (2010.01) |
| *B62K 11/00* | (2006.01) |

(52) U.S. Cl.
CPC .............. *B60K 7/0007* (2013.01); *B60K 1/02* (2013.01); *B60K 1/04* (2013.01); *B62M 6/60* (2013.01); *B62M 6/75* (2013.01); *B60K 2001/045* (2013.01); *B60K 2007/0038* (2013.01); *B60K 2007/0061* (2013.01); *B60Y 2200/13* (2013.01); *B62K 11/00* (2013.01)

(58) Field of Classification Search
CPC ........................... B62K 11/00; B62K 2204/00; B62K 2202/00; B62M 6/00; B62M 6/40; B62M 6/45; B62M 6/75; B62M 6/80; B62M 6/90
See application file for complete search history.

(56) References Cited

U.S. PATENT DOCUMENTS

| | | | | |
|---|---|---|---|---|
| 3,260,324 A | * | 7/1966 | Suarez | B60B 19/00 180/10 |
| 4,163,567 A | * | 8/1979 | Barber | A63B 19/02 180/218 |
| 5,826,674 A | * | 10/1998 | Taylor | A63C 17/12 180/181 |

(Continued)

FOREIGN PATENT DOCUMENTS

| | | |
|---|---|---|
| CN | 102275621.1 | 12/2011 |
| JP | 2000-095177 | 4/2000 |

(Continued)

OTHER PUBLICATIONS

International Search Report and Written Opinion for PCT/US2016/049943 (dated Dec. 15, 2016).

*Primary Examiner* — James A Shriver, II
*Assistant Examiner* — Vaughn Coolman
(74) *Attorney, Agent, or Firm* — Foley & Lardner LLP

(57) ABSTRACT

Powered wheel assemblies and methods of manufacturing and operating such assemblies are provided.

20 Claims, 30 Drawing Sheets

(56) References Cited

U.S. PATENT DOCUMENTS

| | | | | |
|---|---|---|---|---|
| 7,014,272 | B1* | 3/2006 | Williamson | A63H 17/262 |
| | | | | 301/5.1 |
| 7,828,101 | B2* | 11/2010 | Radtke | B62M 6/45 |
| | | | | 180/206.1 |
| 7,992,948 | B2* | 8/2011 | Swain | B60K 6/12 |
| | | | | 188/24.11 |
| 8,123,237 | B2* | 2/2012 | Takemura | F16M 3/00 |
| | | | | 280/105 |
| RE43,232 | E* | 3/2012 | Pyntikov | B62M 6/40 |
| | | | | 180/220 |
| 8,151,924 | B2* | 4/2012 | Radtke | B62M 6/45 |
| | | | | 180/206.1 |
| 8,538,615 | B2* | 9/2013 | Chen | B62M 6/45 |
| | | | | 180/206.5 |
| 9,073,601 | B2* | 7/2015 | Carolin | B62M 13/00 |
| 9,567,034 | B2* | 2/2017 | Sirbu | B62L 3/04 |
| 9,777,774 | B2* | 10/2017 | Biechele | B62J 99/00 |
| 2005/0067207 | A1* | 3/2005 | Radtke | B62M 6/45 |
| | | | | 180/223 |
| 2013/0225360 | A1 | 8/2013 | Hirn | |
| 2016/0011003 | A1* | 1/2016 | Biderman | B60L 15/20 |
| | | | | 701/538 |

FOREIGN PATENT DOCUMENTS

| | | |
|---|---|---|
| KR | 1020050031101 | 4/2005 |
| KR | 20-0384084 | 5/2005 |

\* cited by examiner

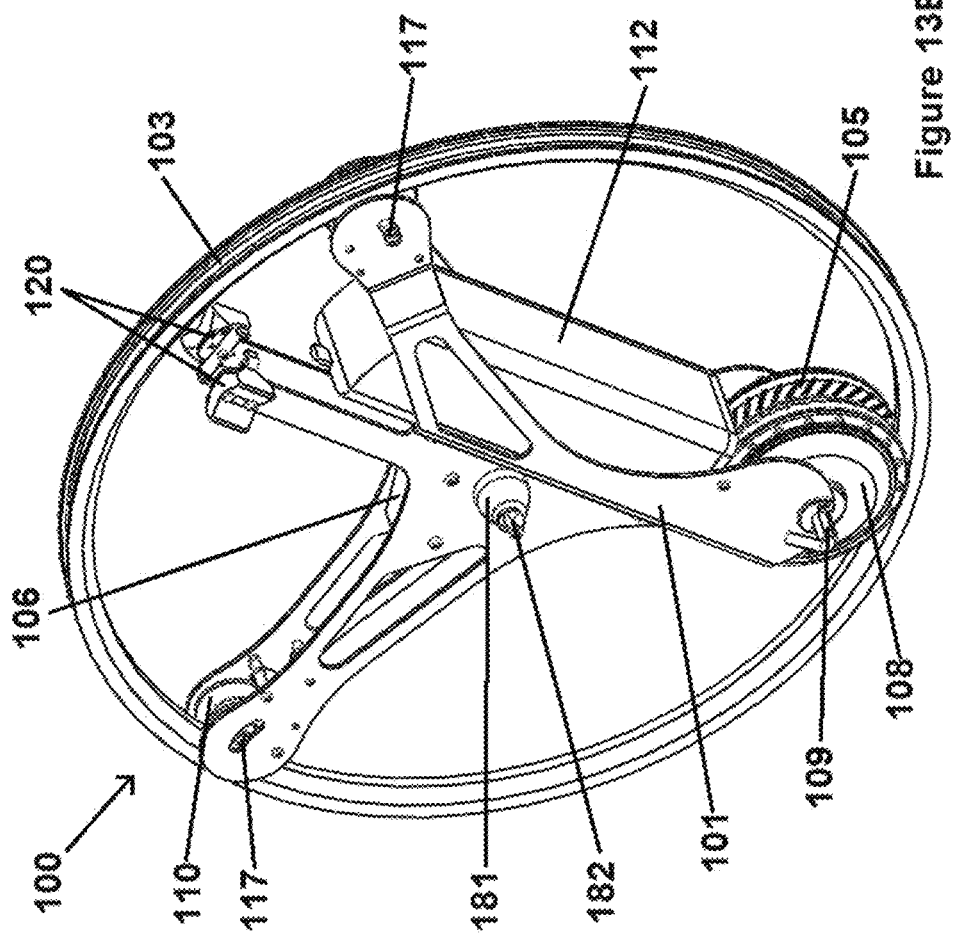

SELF-POWERED PLANETARY ORBITAL WHEEL ASSEMBLIES

RELATED APPLICATIONS

This invention claims the benefit of and priority to and is a non-provisional application of each of U.S. Provisional Application No. 62/045,368, filed Sep. 3, 2014 and titled "Systems and Methods for Actuating a Wheel", and U.S. Provisional Application No. 62/077,491, filed Nov. 10, 2014 and titled "Powered Wheel Assemblies", the contents of which are incorporated herein by reference in their entirety for all purposes.

COPYRIGHT & TRADEMARK NOTICE

A portion of the disclosure of this patent document contains material that is subject to copyright protection. The copyright owner has no objection to the facsimile reproduction by any one of the patent document or the patent disclosure, as it appears in the files or records of any patent office in which the disclosure is filed, e.g., the U.S. Patent and Trademark Office, but otherwise reserves all copyrights whatsoever.

Certain marks referenced herein may be trademarks or registered trademarks of third parties. Use of these marks is solely for providing an enabling disclosure by way of example and is not to be construed as limiting the scope of this invention to material associated with such trademarks.

TECHNICAL FIELD

This disclosure relates to wheel assemblies. More specifically, the present disclosure relates to powered wheel assemblies.

BACKGROUND

Bicycle transportation provides an efficient and cost effective mode of transportation, particularly within dense urban environments. However, some people desiring to commute from one location to other, for work, leisure, or other purposes, may be reluctant to do so in view of the physical exasperation that might be experienced and the associated discomfort associated with physical exertion required to efficiently and effectively traverse a desired route.

Some electric bicycles powered wheel assemblies have disadvantages associated with the requirement that electric power be provided to the bicycle via actuation at the sprocket of the bicycle. Such a requirement generally requires disassembly of the chain and sprocket assembly or complex integration within the sprocket and chain assembly.

SUMMARY

Various embodiments disclosed herein provide a powered wheel assembly and methods of manufacturing and operating a powered wheel assembly.

In view of the foregoing, powered wheel embodiments disclosed herein provide a wheel that is significantly simplified, provides reduced failure points and thereby greatly reduces production costs. Additionally the powered wheel embodiments disclosed herein allow the integration of storage space useable to house personal items, as well as emergency and other items including, but not limited to, medical kits, electronics, communication devices, lights, blinkers, horns and bicycle tools. The wheel disclosed can also be operated by a variety of user interfaces including but not limited to traditional thumb and twist throttle mechanisms as well as foot operated throttle mechanisms which are often referred to as "Peddle Assist," as well as being controlled by electronic devices including mobile phones, tablets, computers, radio controllers and others, including any combination of these.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIG. 13A shows an example wheel assembly with one drive roller 105 and two guide rollers 110, able to rotatably couple a rim. While FIG. 13B-C show a perspective view and a cross section view of an assembly with one drive roller 105, one motor 108, two guide rollers 110, and a rim.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive powered wheel assemblies. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1A:
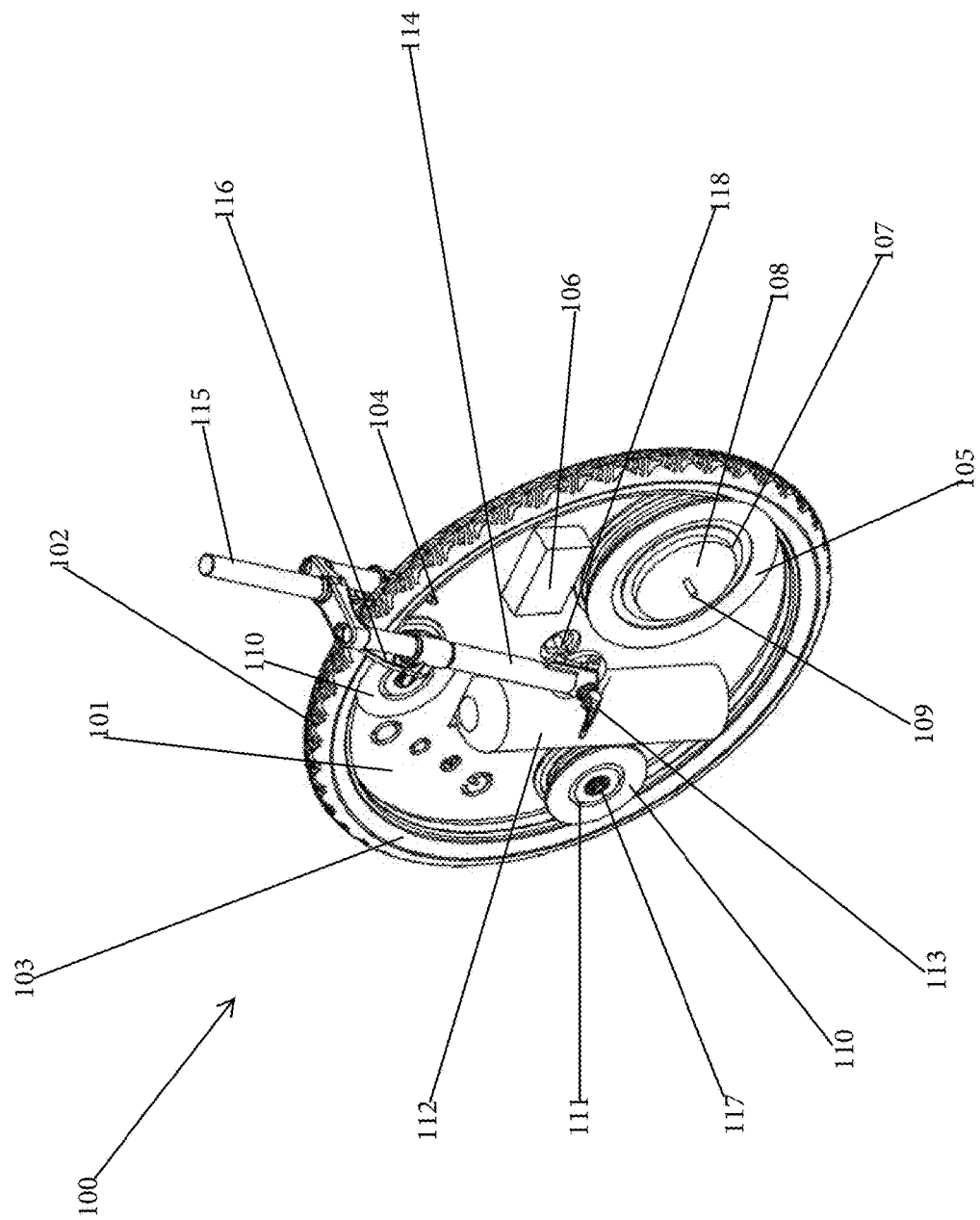
FIGS. 1A, 1B, show a perspective view of an electrically powered bicycle wheel assembly partially opened, in accordance with example embodiments.
Figure 1B:
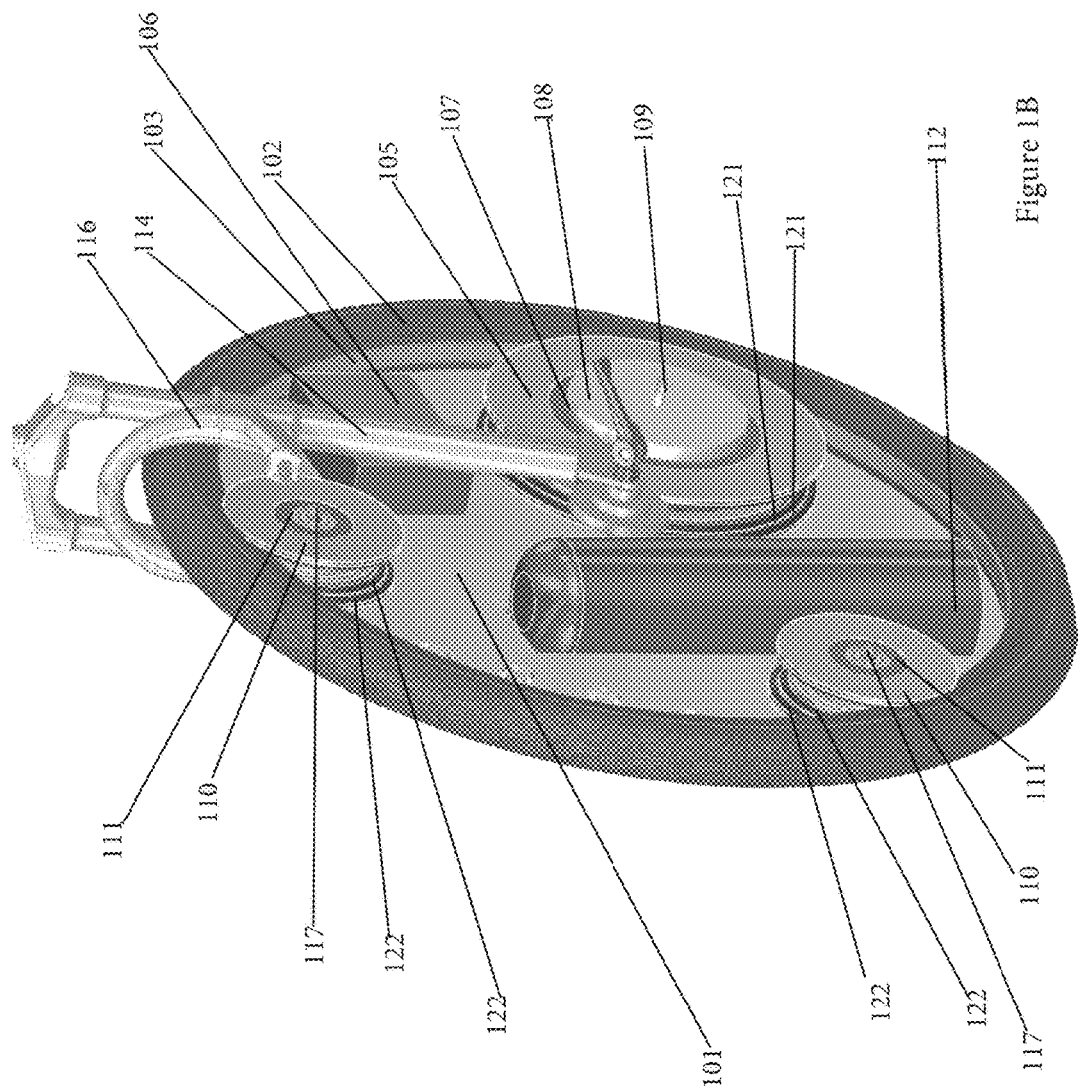
Figure 1C:
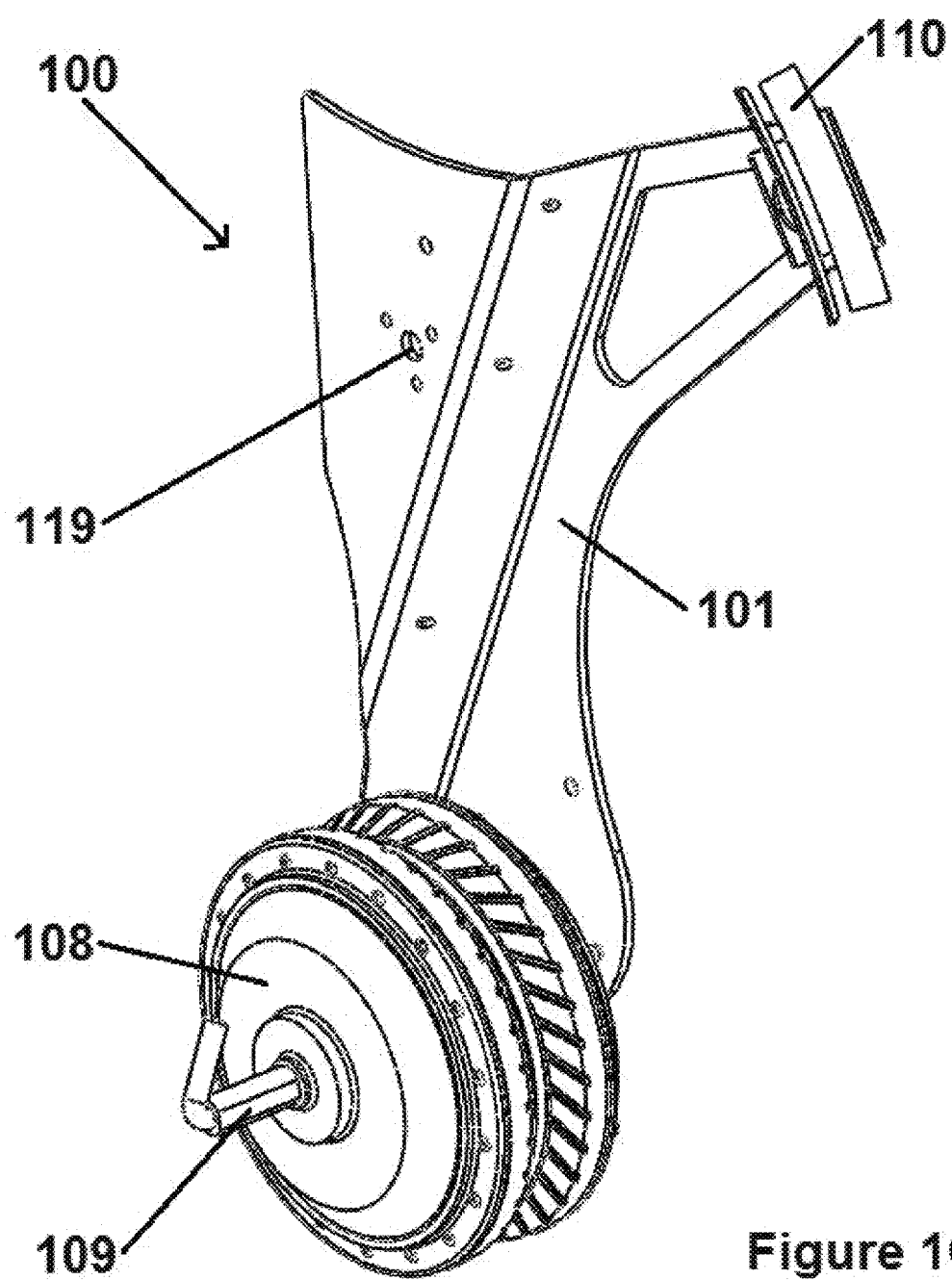
FIGS. 1C-1H show perspective views of other example embodiments.

FIGS. 1A and 1B show a perspective view of an electrically powered bicycle wheel assembly partially opened, in accordance with example embodiments. A powered wheel assembly 100 is generally composed of a pair of parallel hub plates 101 positioned in a tire rim 103. The tire rim 103 includes a tire 102 positioned thereon. The tire 102 includes, but is not limited to, a pneumatic tire filled with a fluid or gas such as air via a valve stem, or a solid tire made from either a soft or firm material 104. FIGS. 1A-2 show an opened view of the powered wheel assembly 100 with one of the parallel hub plates 101 removed for viewing the interior components of the powered wheel assembly 100. While the hub plate 101 is illustrated with a circular geometry, the hub plate 101 may have a variety of geometries in accordance with example embodiments, including, but not limited to a triangular geometry, a square geometry, a star shaped geometry, an unsymmetrical shape or other geometries covering less than the entire interior area of the tire rim, with any number and shape of internal cut-outs 103. The hub plate 101 includes a plurality of components configured to transmit power to the tire 102 for actuation of the tire 102.

The hub plate 101 is configured to remain stationary with respect to the bicycle forks 114 and the bicycle frame 901. As discussed further herein the drive roller(s) 105 and the guide roller(s) 110 rotate with respect to the hub plate 101 and the tire rim 103, but generally remain in the same position on the hub plate. The guide roller(s) could be replaced by different guide mechanisms, for instance guides that laterally support the rim through friction on magnetic force. One or more drive rollers 105 are configured to transmit torque from one or more motors 108 to the tire rim 103 to cause rotation of the tire 102 about the powered wheel axle 118. The motor 108 is controlled by a controller 106. In example embodiments, the motor 108 includes, but is not limited to, an electric brushed or brushless motor, such as a dual or single axial pancake shaped motor including but not limited to the 36V250W Bafang SWXK5 front driving motor. The motor(s) 108 is mounted to at least one of the hub plates 101, which hub plate may include a shelf for supporting the motor(s) 108 between the two hub plates 101. In example embodiments, the hub plate 101 may include a motor aperture permitting the motor 108 to extend through the hub plate. The aperture may provide support to maintain the motor 108 in a fixed position with respect to the hub plate 101.

The motor(s) 108 may be directly coupled to the drive roller(s) 105 or the motor(s) 108 may be indirectly coupled to the drive roller(s), for example via one or more belts, chains, or gears to impart rotation to the drive roller(s) 105. Additionally, example embodiments may provide the motor 108 positioned within the drive roller 105 While the illustrated embodiments illustrates the powered wheel assembly 100 with a single motor 108 and a single drive roller 105, example embodiments may include a plurality of drive rollers and/or plurality of motors.

Figure 1D:
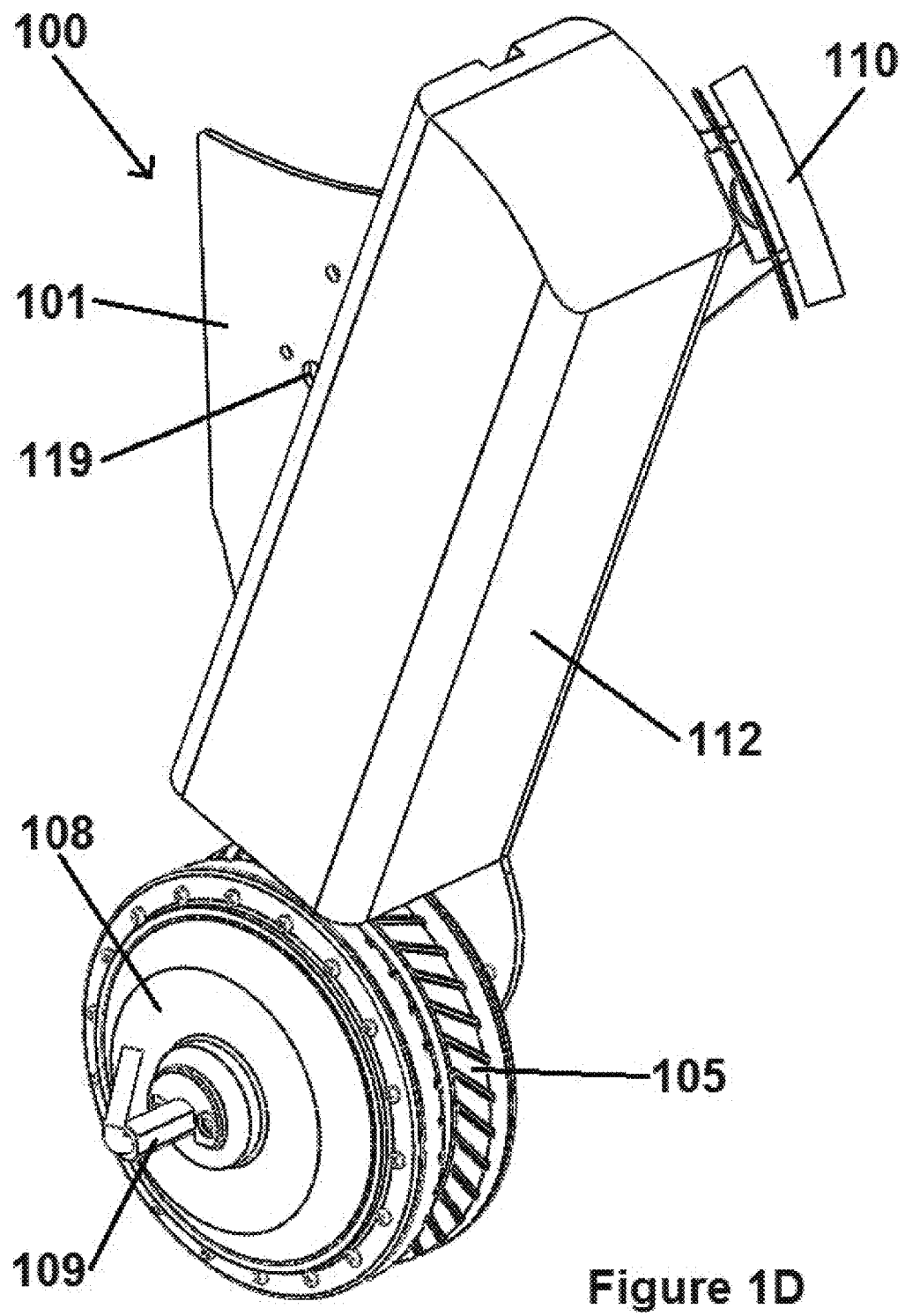
Figure 1E:
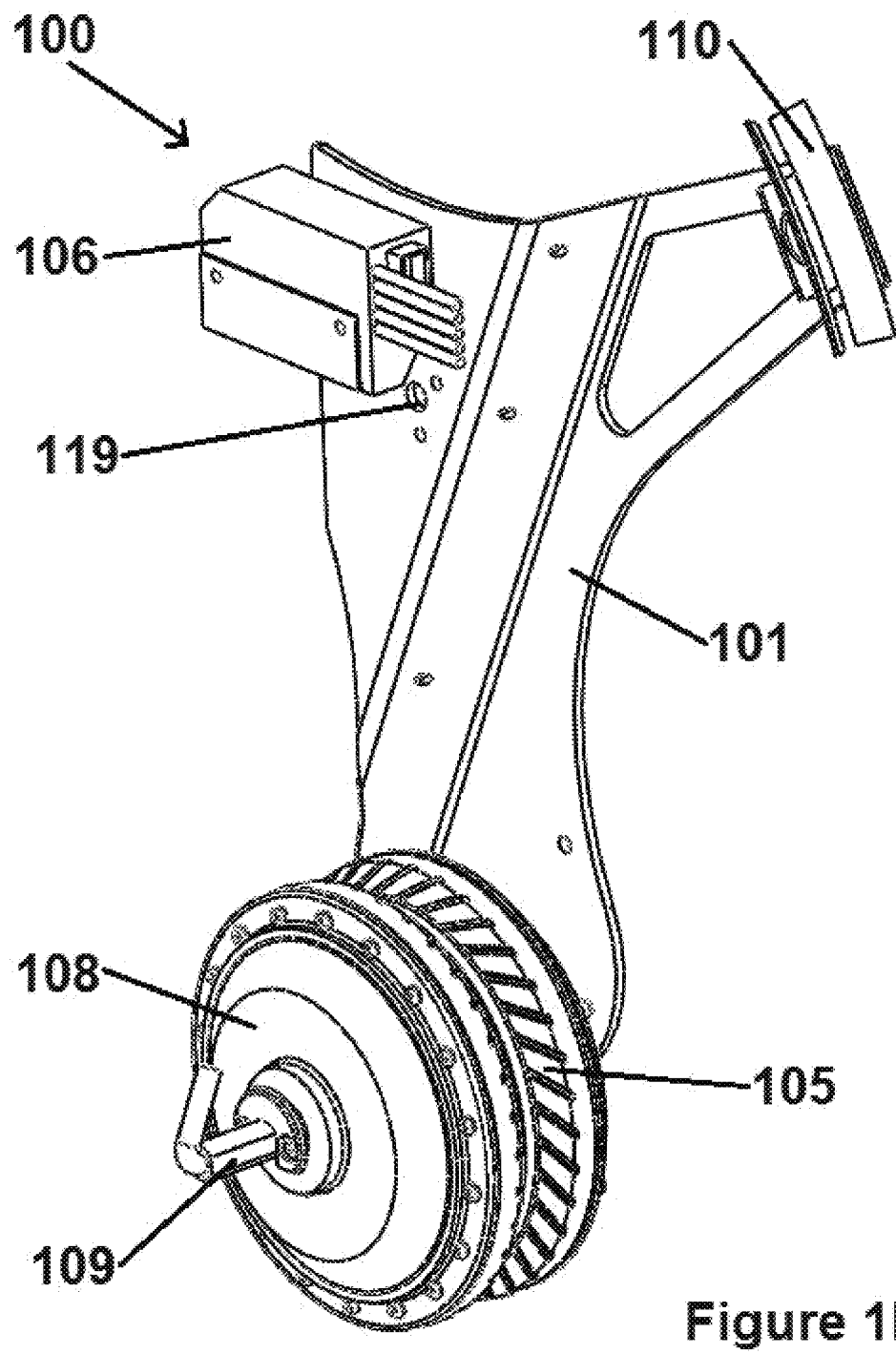
Figure 1F:
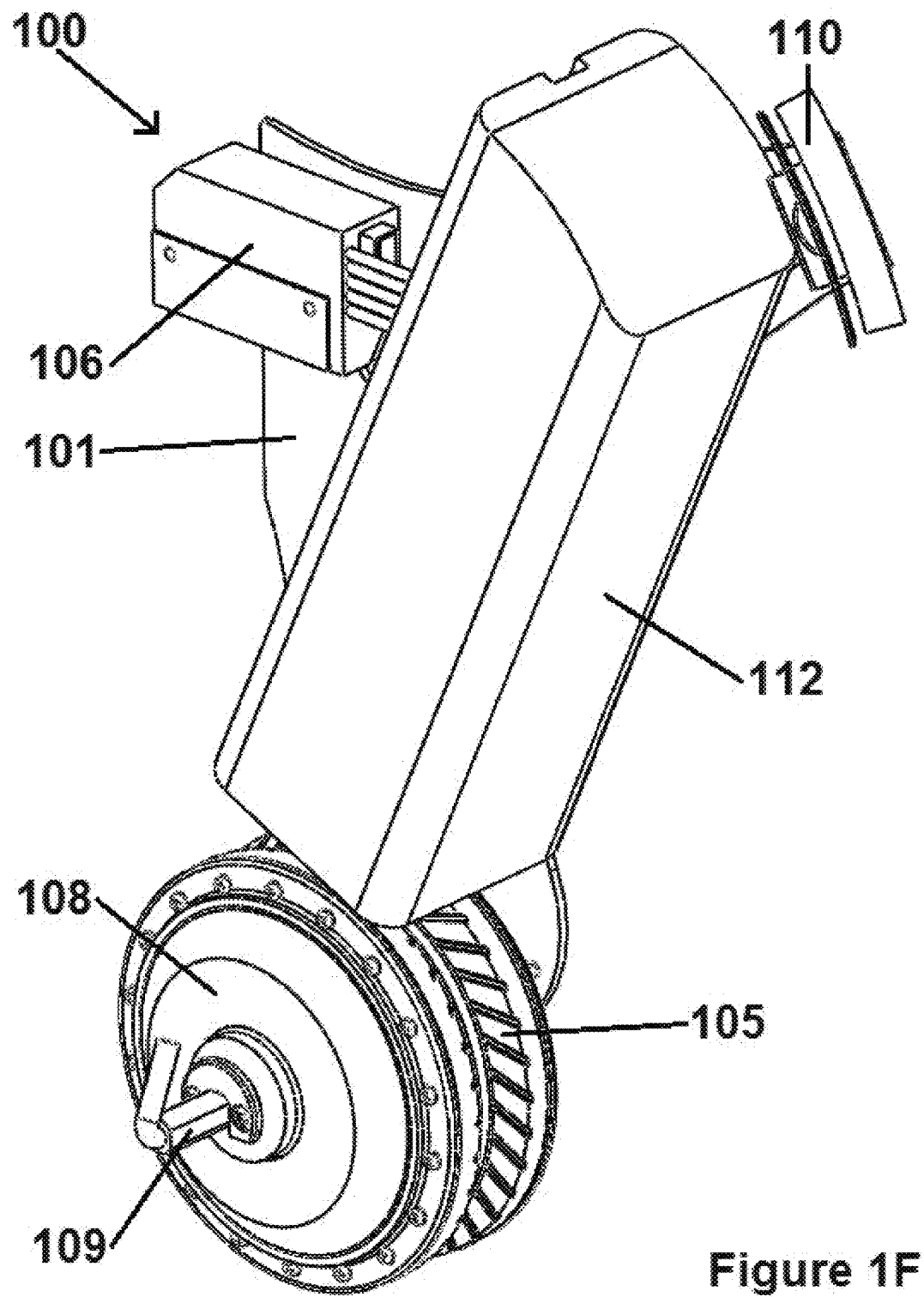
Figure 1G:
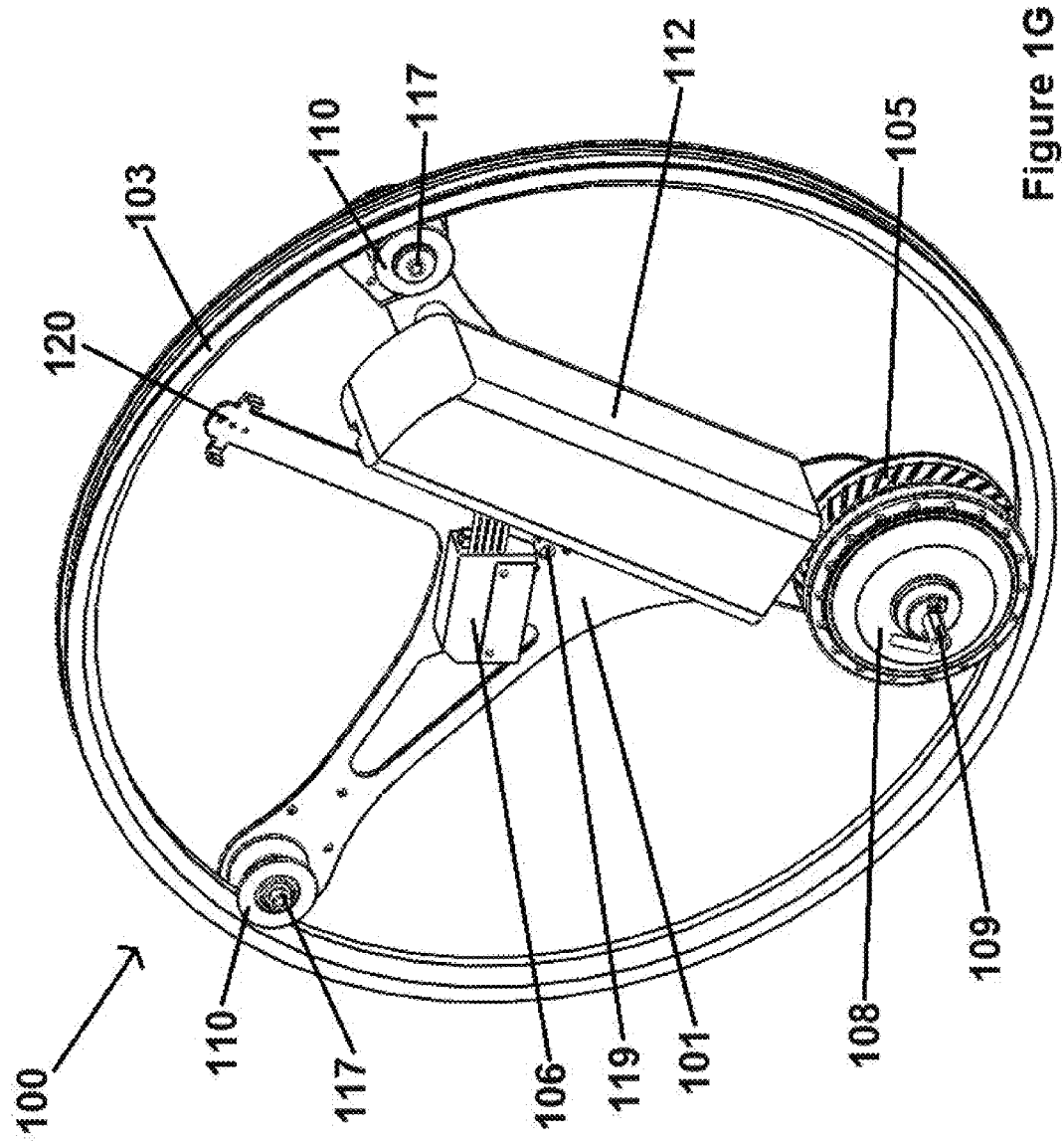
Figure 1H:
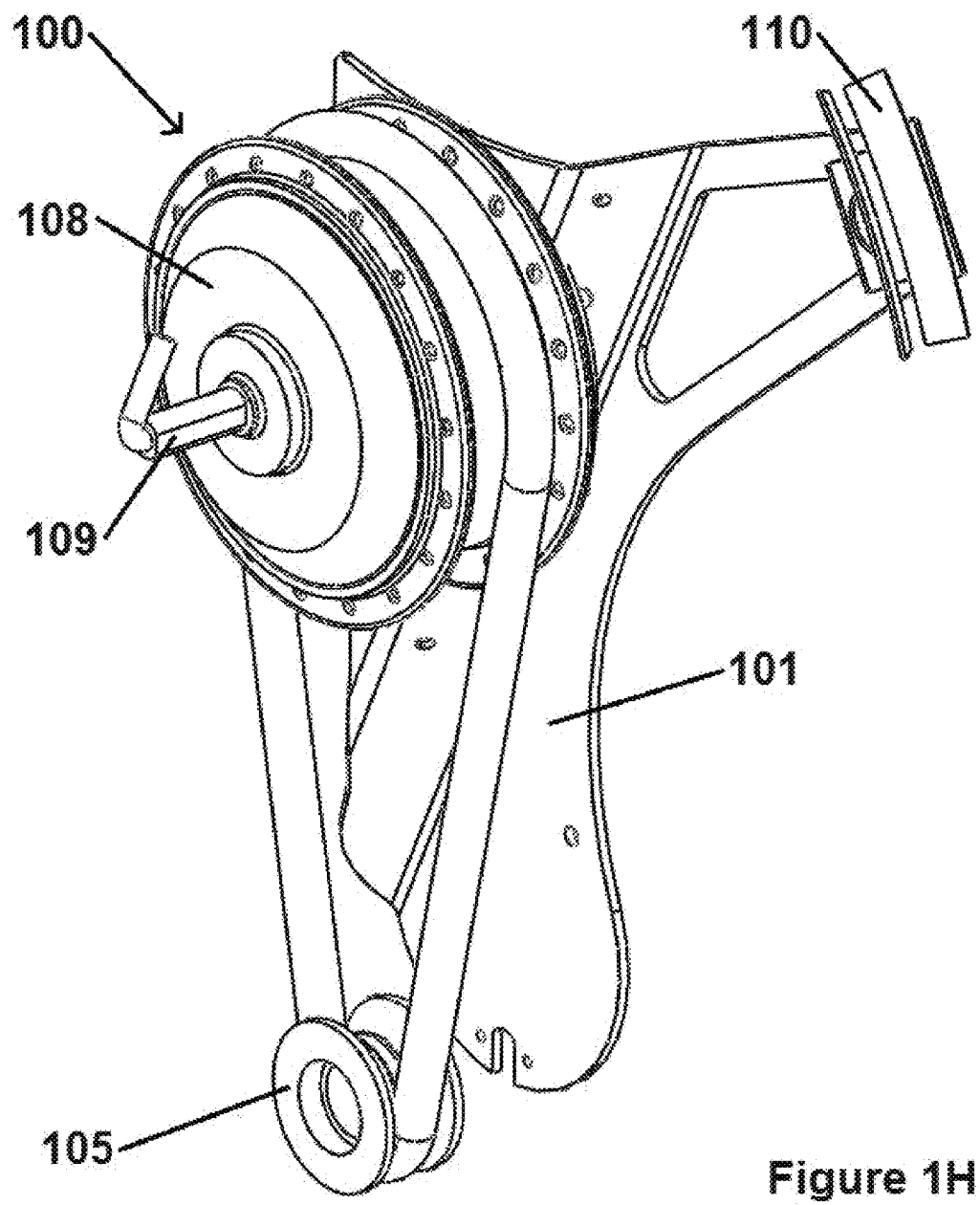
Figure 2:
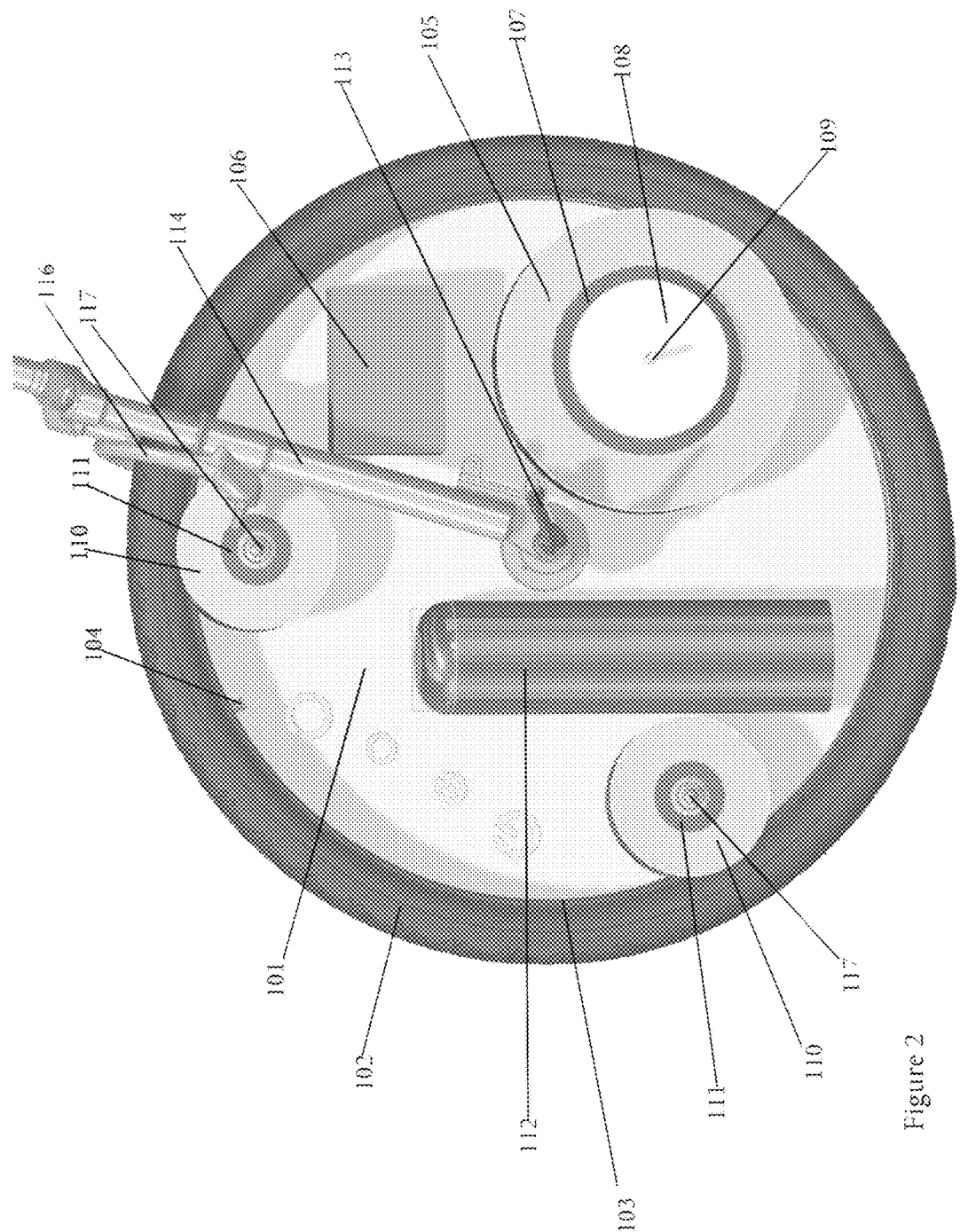
FIG. 2 shows a side view of the partially opened electrically powered bicycle wheel assembly of FIG. 1A.

FIGS. 1C-1H show perspective views of possible other embodiments of this invention. In one embodiment, illustrated in FIG. 1C one roller 105 is mounted onto one or more hub plates 101, this roller can be powered by an embedded motor 108 and is configured to receive a rim. The one or more hub plates 101 have a means, for mounting them to the vehicle. Such means can have a center point hole 119, or a protrusion, or a pin to mount the one or more hub plates to a point on the vehicle, such as the fork of a bicycle, by means of a bolt and nut, or by means of a skewer, or a fastener, or any other friction based retaining device. The hub plate could also be welded or glued to the vehicle. The hub plate could include the fork of a bicycle, and the fork can have a means for mounting it to the vehicle. The means for mounting the hub plates, may or may not contain a means for attaching the hub plate at a different point, other than the center point, such means could be as simple as a strap attached to the one or more hub plates, or could be another hole that can be used with a bolt and a nut, or a hole that can be used with a screw, or hole that can be used with a strap. For instance FIG. 1G shows a torque arm that can be attached to the vehicle at some place on the arm. The hub plate could also be welded to the vehicle at another point.

FIGS. 1C-1F and FIG. 1H also show implementations of guide mechanisms 110 using friction based guiding.

In another embodiment, illustrated in FIG. 1E, the wheel assembly also contains a controller 106, and in yet another embodiment it also contains a source of energy 112, illustrated in FIG. 1D, such as one or more batteries 112. In some embodiments, as illustrated in FIG. 1F the wheel assembly contains one or more controllers 106, as well as a source of energy, such as a battery 112.

In one embodiment, illustrated in FIG. 13, one or more of the rollers 105 can be positioned essentially near the bottom of the wheel. As an example, a drive roller 105 can be positioned slightly forward, which would help protect the rim from deformation as a consequence of impacts when riding against the curb of a sidewalk. As another example a drive roller 105 can be positioned to protect the rim when riding into a pothole. In the embodiment shown in FIG. 13 the motor 108 is laterally aligned with the rim 103, which provides greater stability on a bicycle and unicycle. Additionally in this embodiment, the drive roller 105 and motor 108 are positioned near the bottom of the wheel and are laterally aligned with the wheel. A bicycle and a unicycle drive more safely and more efficiently in such a configuration, than when the motor would be positioned outside of the wheel plane. When drive roller and the wheel rim are laterally aligned, then the weight of the driver pushes the roller and the rim together, increasing transmission efficiency. A motor residing outside of the wheel plane and positioned near the ground will likely touch the ground at some point, creating a hazard for the driver. Also a design where the drive roller encompasses the motor allows using a regular e-bike motor. It is worthwhile noting, that one benefit of some of the embodiments presented in this application is the larger dimensional tolerance of the rim, compared to conventional wheels, without compromising the riding comfort at all. Indeed, the shape of the wheel rim does not determine the distance between the road and the rider's seat, which is determined by the one or more hub plates and the position of one or more of the rollers with respect to the one or more hub plates. This makes that the wheel rim can be essentially circular, that is oval or egg shaped or some other imperfectly circular shape, without impacting riding comfort. This makes that production tolerances can be less stringent and therefore can reduce the production cost of the wheel. The rim could also be a tread that is not at all circular and is more or less flexible.

Figure 12:
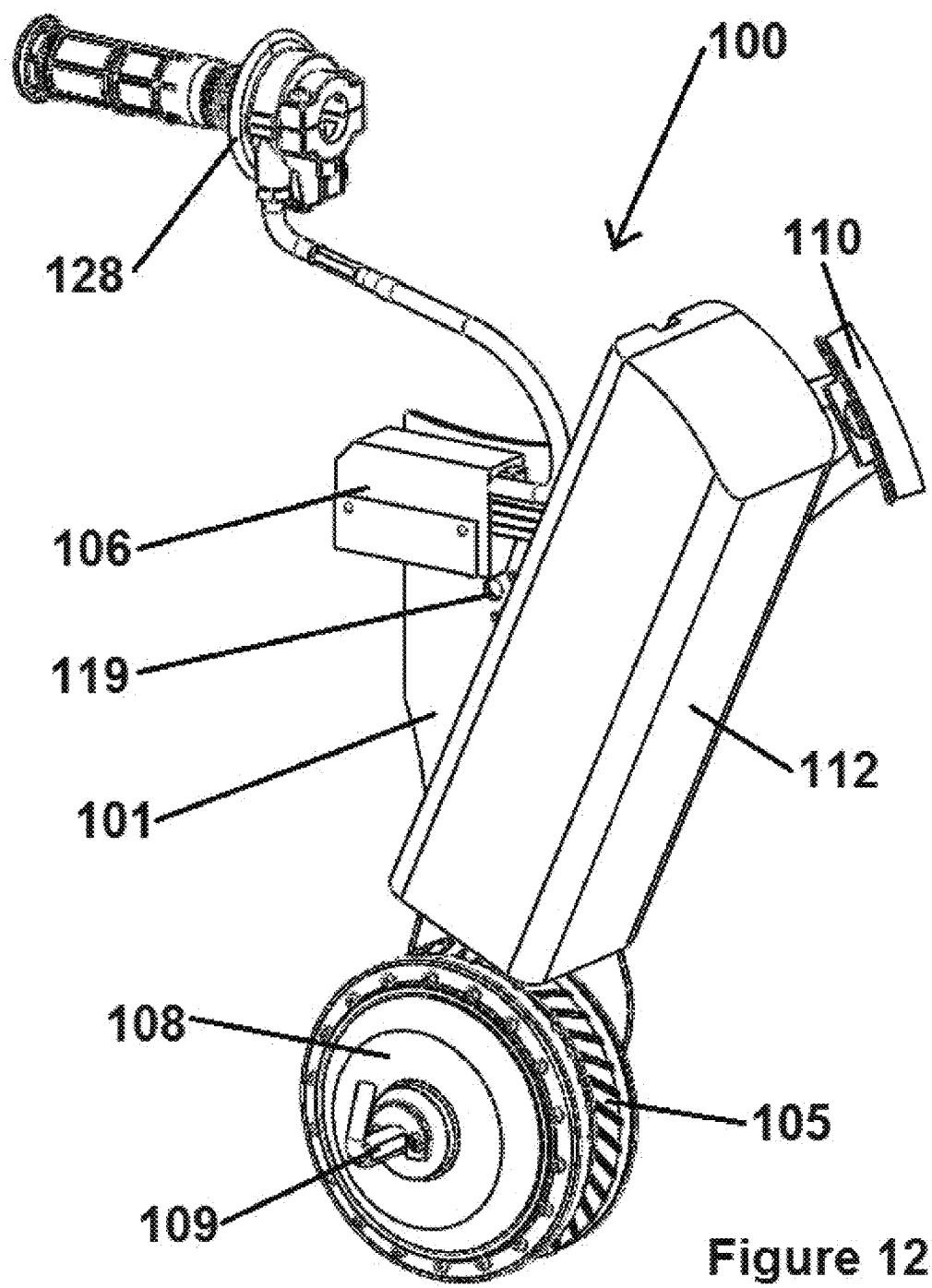
FIG. 12 shows an example user interface 128 for controlling the power input from the energy supply to one or more motors, in which the user interface is mounted on a handle bar.

The motor 108 is powered via one or more batteries 112 coupled to the hub plate 101. The battery 112 may include, but is not limited to, the 36V 1 OAR Samsung Ii-ion Bottle battery. In another embodiment other types of energy supplies can be used in combination with the one or more batteries, or such other types of energy supplies can replace the one or more batteries altogether. An example of such other energy supplies could be one or more fuel cells, or one or more solar cells. Such other energy supplies may or may not recharge the battery while the bicycle is in operation or standing still. The battery 112 is electrically coupled to the motor via one or more electrical contacts or cables coupled to or housed within the hub plate 101. The battery may be removably coupled to the hub plate 101 and may be environmentally sealed independent of the hub plate 101 or the hub plate 101 may include a housing configured to environmentally seal the battery. The motor 108 and/or the battery 112 may be coupled to a controller configured to control the actuation of the motor 108. Such controlled actuation can be as simple as "on/off" regulation, or can be a regulation that gradually increases the power supplied to the motor, or can be a regulation that enables "on/off braking" or a gradually increased regenerative braking, or braking through electric dissipation of currents generated by the one or more motors, or any combination of possible regulations for operating the bicycle. In one embodiment, the controller provides a minimum motor current that counteracts the resistance inherent in the assembly, thereby providing a more traditional peddling experience. The throttle mechanism may be mounted to the handle bars of a bicycle, as illustrated in FIG. 12 the bike frame, the pedals in the case of a foot activated "pedal assist" mechanism, or an electronic device and connected to the controller 106 via a cable extending from the powered wheel assembly 100, or by any wireless method.

The hub plate 101 includes guide rollers 110 configured to guide the rotation of the rim 103 and tire 101 by contacting the rim 103 and maintaining the alignment of the rim 103 with respect to the hub plates 101. Other mechanisms can be used to guide the rim with respect to the hub plates, such as guides that use friction or guides that use magnetic force. For the purpose of this disclosure guide rollers should be interpreted as rollers, or mechanisms with an equivalent function of guiding the rim with respect to the hub plates. As discussed further herein, the guide roller(s) 110 and the drive roller(s) 105 may or may not include a central channel to allow room for the passing valve stem in the case of pneumatic or inflatable tires, with contact areas to receive the rim 103 therein and to engage the rim 103. Specifically, the drive roller(s) 105 engages the rim 103 to both drive the rim 103 and maintain alignment of the rim while the guide roller(s) 110 engage the rim 103 only to maintain alignment of the rim 103. Accordingly, each of the drive roller(s) 105 and the guide roller(s) 110 are configured to rotate about their own central axle. This roller axle also acts as a support strut extending from and coupling one hub plate 101 to the other hub plate 101 to provide a cross support bracing hub plates 101 laterally to increase the stiffness of the powered wheel assembly and resist bending or warping. Additionally, the drive roller(s) 105 and guide roller(s) 110 may include an elastic core or may be made entirely or partially out of a material with elastic properties such as rubber, urethane, plastic or other materials and combinations of composites. This elastic component 107 or 111 may be concentrically positioned and is configured to absorb an impact or vibrations transmitted to the bicycle tire 101 and subsequently to the drive roller(s) 105 or guide roller(s) 110 respectively, via the rim 103, for example when the tire 101 rotates over an uneven surface or object.

Figure 10:
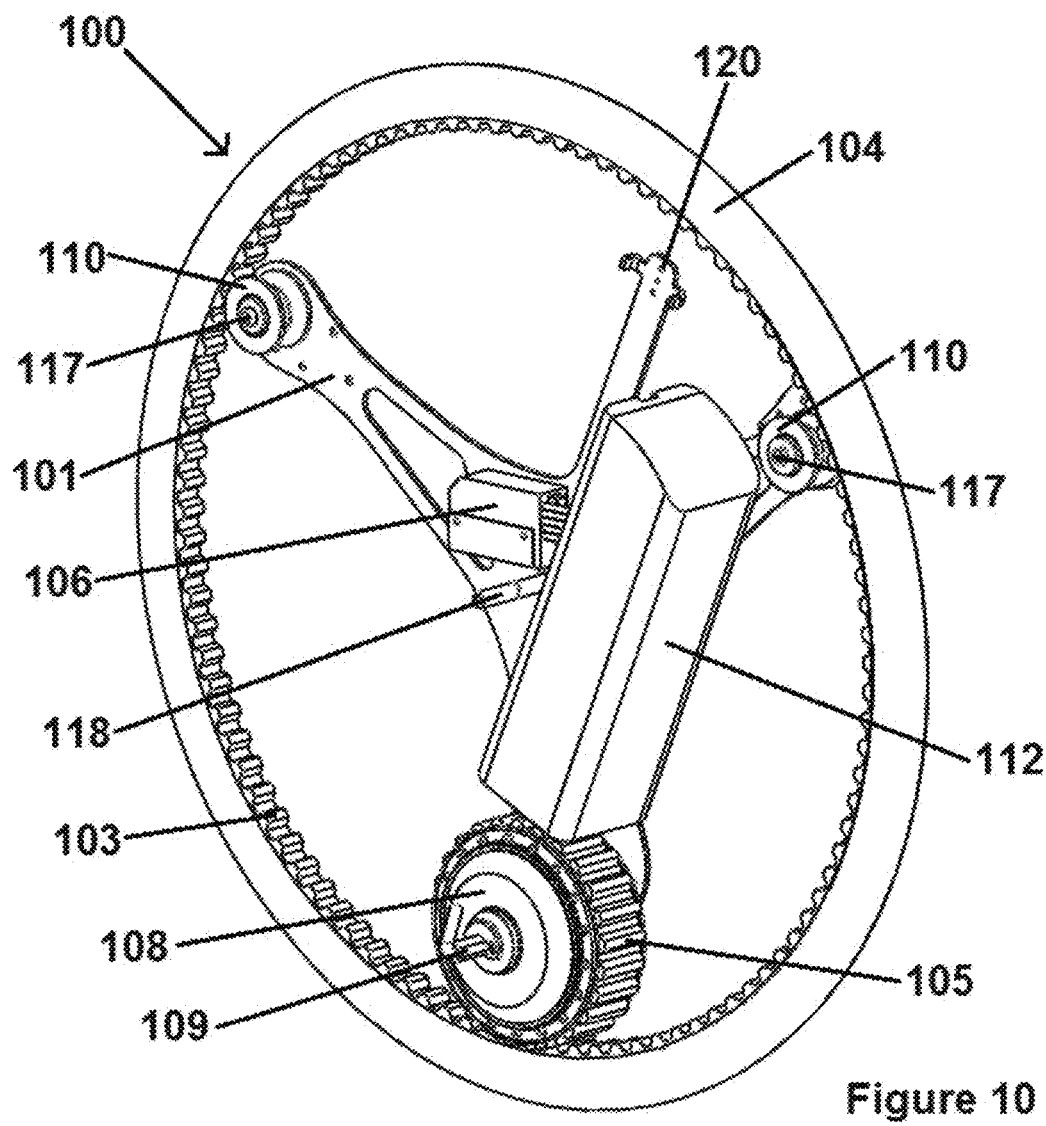
FIG. 10 shows an example embodiment of a roller 105 and rim 103 with cogs and groves.

As further demonstrated in FIG. 1, the powered wheel assembly 100 is coupled to bicycle forks 114 extending from a head tube 115 of a bicycle as discussed further herein. The powered wheel assembly 100 has a means for mounting the assembly to the vehicle, for instance the bicycle forks 114. Such means may include the powered wheel axle 118, which may include one or more quick release couplings 113 configured to lock and unlock the powered wheel axle 118 from the bicycle forks 114. Additionally torque arms 120 may be included in the means for mounting the assembly, to better redistribute the force along the bicycle forks 104. Such torque arms 120, as shown in FIG. 10, as well as a device for attaching such torque arms to a vehicle, such as a strap, a screw, may or may not be part of a means for mounting the wheel assembly to a vehicle. Also, a quick release coupling 113, may or may not be part of a means to mount the assembly to the vehicle.

Figure 5:
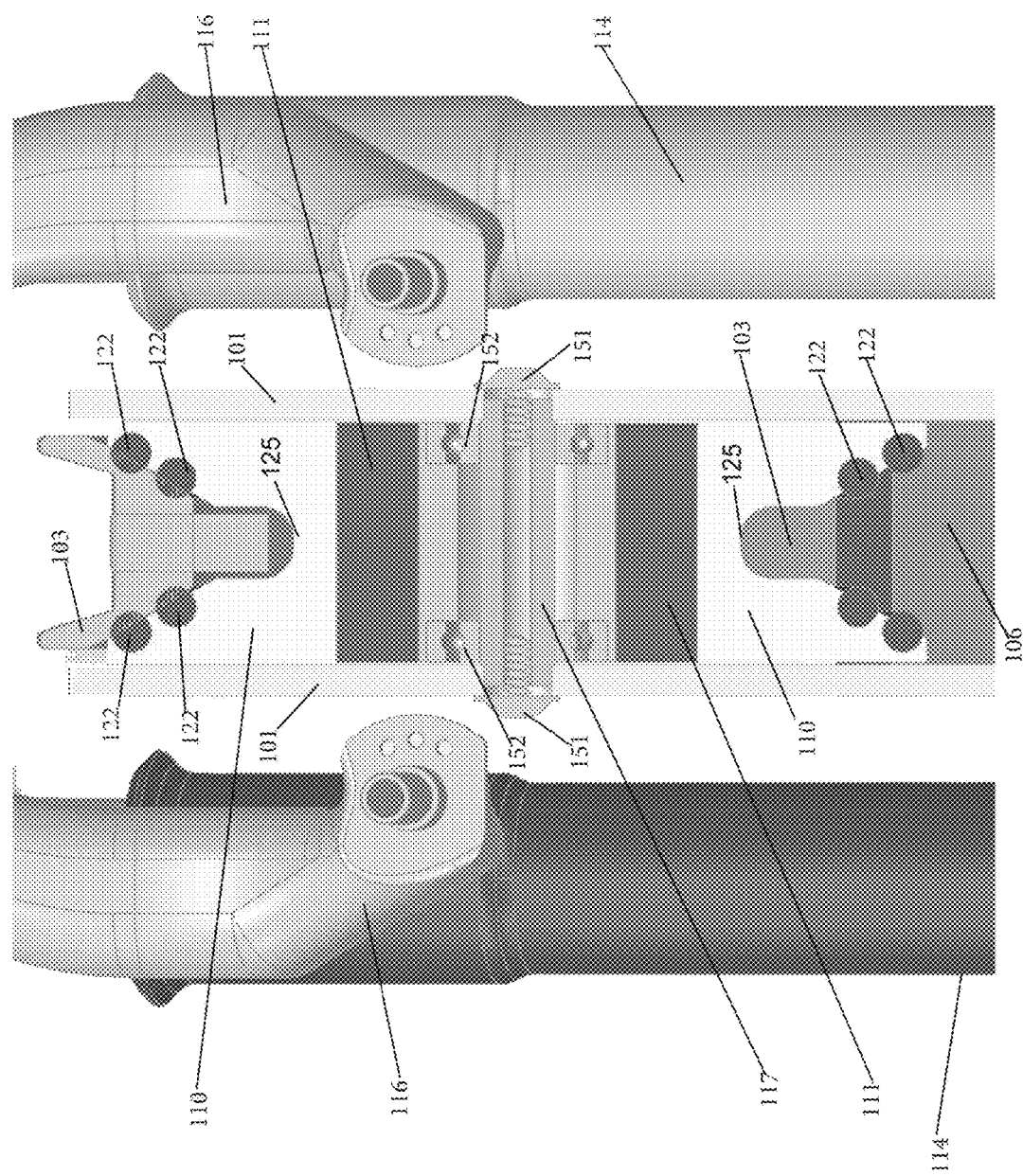
FIG. 5 shows a cross sectional front view of the electrically powered bicycle wheel assembly of FIGS. 1A-4.
Figure 6A:
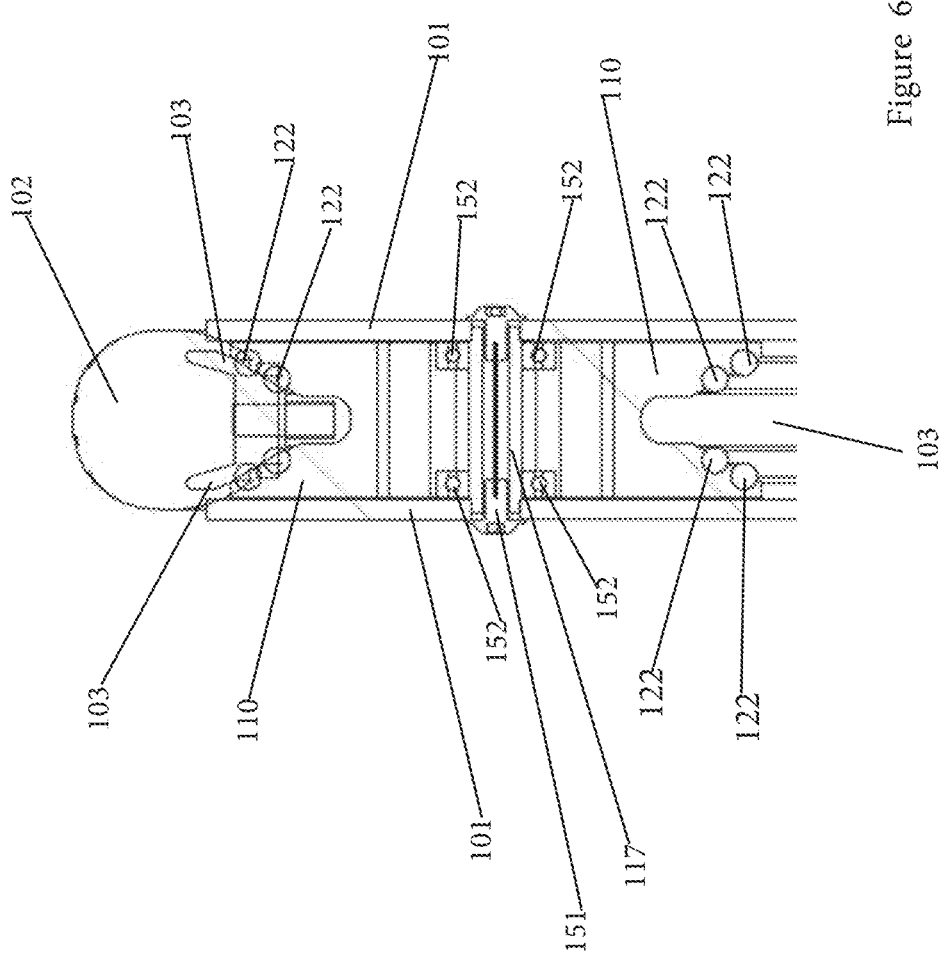
FIG. 6A provides a cross sectional view of the closed electrically powered bicycle wheel assembly of FIGS. 1A-5.

FIG. 2 is a side view of the partially opened electrically powered bicycle wheel assembly of FIG. 1. As further illustrated in FIG. 5 and FIG. 6A, the guide roller(s) 110 and the drive roller(s) 105 may include guide roller O-rings 122 and drive roller O-rings 121 respectively configured to promote contact between the tire rim 103 and the guide rollers 110 and the drive roller 105. Alternatively the guide roller(s) 110 and/or drive roller(s) 105 may have the entirety of the contact patch with tire rim 103 be constructed out of an alternative material that promotes friction power transmission including rubber, urethane or plastics. Additionally, the guide roller(s) 110 and/or drive roller(s) 105 may contact the rim 103 with mechanical interference such as that of interlocked gears or sprockets and chains. As shown in FIG. 5 and FIG. 6A2 and illustrated further herein, the guide wheel O-rings 122 and drive roller O-rings 121 are positioned about a plurality of graduated grooves disposed in the channels of each of the guide rollers 110 and the drive roller 105. The channel in the guide rollers 110 and the drive roller 105 may be shaped to permit the valve stem 104 of the tire 102 to pass therethrough during rotation of the rim 103. As an example the one or more rollers and one ore more guide mechanisms may have a profile shape that is either shaped convex, or concave. For instance essentially U-shaped, V-shaped, W-shaped, or shaped in some other way, allowing for a good coupling of the one or more rollers with the rim. Such shape of a roller and a guide mechanism may also accommodate the pass through of the valve stem of an inflatable tire. FIG. 2 further illustrates implementation of a brake 116 which may be implemented in connection with example embodiments disclosed herein.

Figure 3:
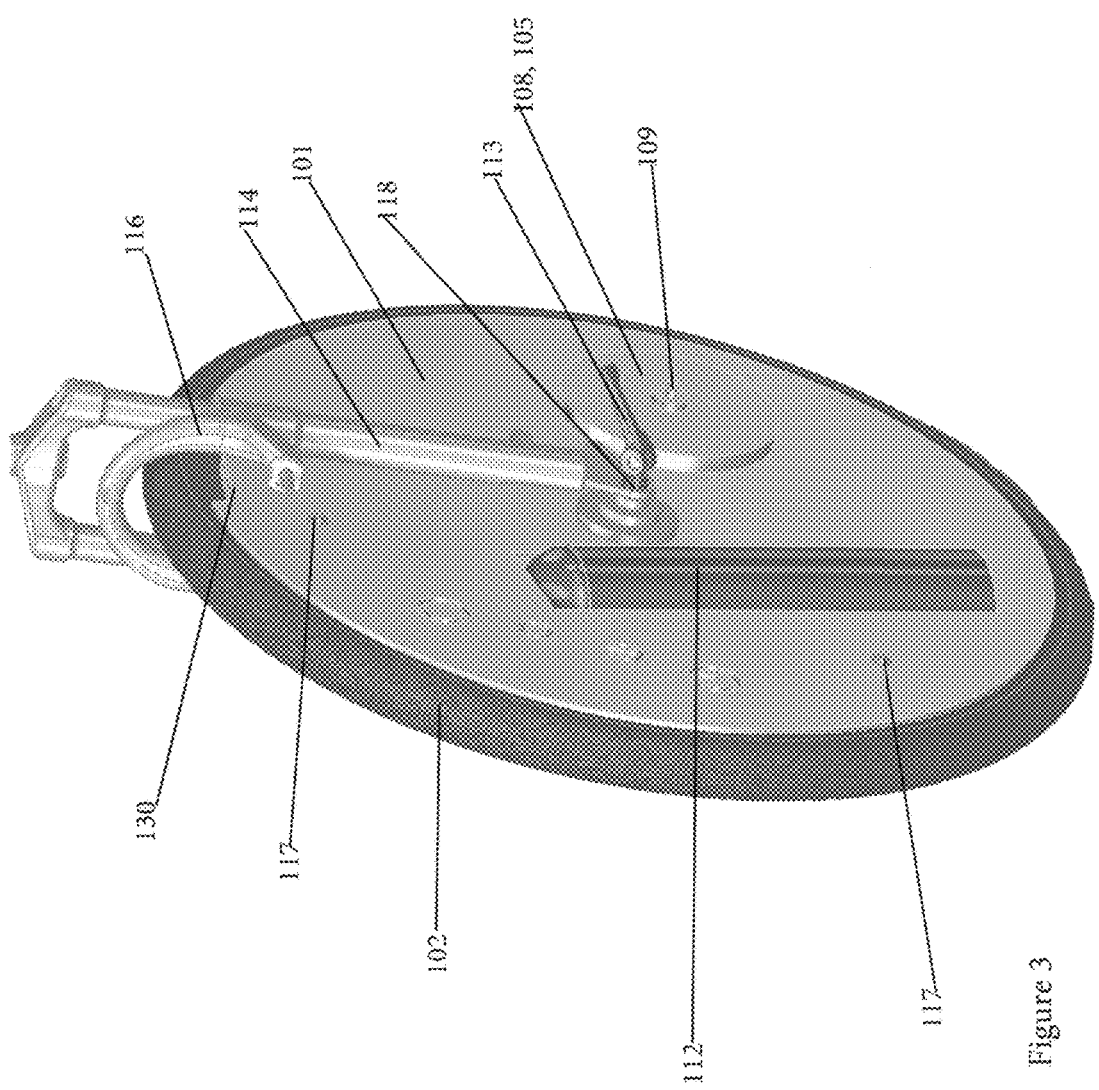
FIG. 3 illustrates a perspective view of the electrically powered bicycle wheel assembly of FIG. 1 closed in accordance with example embodiments.
Figure 4:
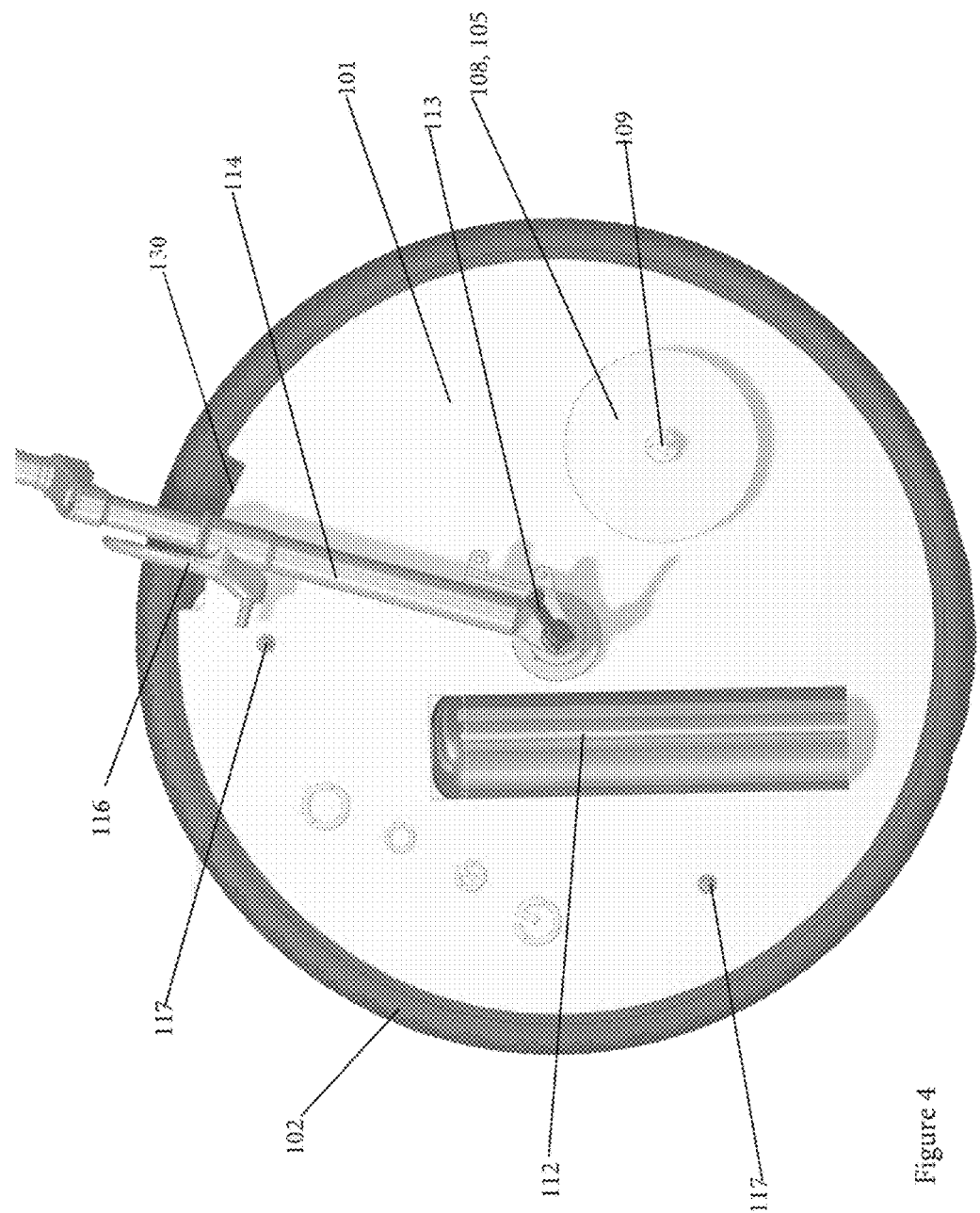
FIG. 4 shows a side view of the closed electrically powered bicycle wheel assembly of FIG. 3.

FIG. 3 illustrates a perspective view of the electrically powered bicycle wheel assembly of FIG. 1 closed in accordance with example embodiments. In accordance with example embodiments, the hub plate 101 may be configured to house other components in accordance with example embodiments. For example, an electrical outlet may be positioned in the hub plate 101, which outlet may be provided with an electrical power supply accessible from operation of the wheel as an electrical generator. The hub plate 101 may also contain strategically positioned trough-holes also referred to as speed holes that will reduce the weight of the assembly, provide ventilation and cooling and facilitate a unique visual style. Additionally because various embodiments disclosed herein implement a brushed or Brushless DC motor capable of charging a battery connected to the powered wheel assembly 100, this allows the powered wheel assembly 100 to advantageously function as an electrical generator to power electrical accessories and to increase the range of travel of a bicycle equipped with the wheel. The outlets for the power supply may be integrated into the wheel or may be accessed via handlebar-mounted controls to allow charging during riding. Additionally, the electrical connectivity provided by particular embodiments of the powered wheel assembly disclosed herein advantageously allow the wheel to integrate devices and sensors to connect to mobile devices and/or the internet allowing the wheel to contain and broadcast key information about location, operating parameters, security, and other information of interest that may be used uniquely to gamify, safeguard, and otherwise enhance the cycling experience FIG. 4 shows a side view of the closed electrically powered bicycle wheel assembly of FIG. 3. Specifically, FIG. 4 shows the powered wheel assembly with hub plates 101 coupled to one another to house the guide rollers 110, the battery 112, the driver roller 105, and the motor controller 106 therein. The hub plates 101 may be coupled to the guide roller support strut 117 the drive roller support strut 109 the powered wheel's central axle and any number of other support struts. One or more fasteners, such as a screw, may extend through the hub plate 101 and into the axles or support struts 117 and 109 to removably couple the hub plates 101 thereto. The hub plates 101 include a brake aperture 130 configured to allow the brake pad of brake 116 to contact the rim 103 to permit standard braking implementation. Because the hub plates 101 remain stationary when the tire 102 rotates the brake aperture 130 also remains stationary so that braking is not impacted by implementation of the powered wheel assembly 100. Accordingly, the powered wheel assembly may be implemented with any standard bicycle, via simply swapping the front wheel out without complex implementation and without impacting the standard drive mechanism of a bicycle, permitting implementation with a bicycle having a single gear or a complex multi-gearing mechanism. In example embodiments, the powered wheel assembly 100 may be configured for electronic braking by reverse operation of the driver roller 105 to resist or reverse rotation of the tire rim 103 and the tire 102, adding resistance to the motor and of reversing the rotation on the motor may also be used to regenerate battery 112. As further demonstrated in FIGS. 3 and 4, the hub plate 101 may include a battery aperture 131 configured to allow a battery that is wider than the width of the coupled hub plates to be positioned therein without interference with operation of the powered wheel assembly 100 or other bicycle components such as forks 114. However, as discussed herein, the powered wheel assembly 100 may be implemented with a battery housed completely within the hub plates 101.

FIG. 5 shows a cross sectional front view of the electrically powered bicycle wheel assembly of FIGS. 1A-4. FIG. 5 shows the powered wheel assembly 100 with the tire 102 removed from the tire rim 103. The powered wheel assembly 100 is sectioned at one of the guide rollers 110. Accordingly, the internal components of the guide roller 110 are visible. As illustrated the guide roller support strut 117 couples and laterally separates the hub plates 101. The axle screws 151 removably couple the hub plates 101 to the guide roller support strut 117. The guide roller support strut 117 acts as an axle for the guide roller 110 via bearing 152 that permit the guide roller 110 to rotate about the guide roller support strut 117. The guide wheel O-rings 122 positioned in the channel 125 in the graduated grooves of the channel 125 to promote contact of the guide roller 110 with the tire rim 103. As demonstrated in FIG. 5 the guide roller elastic core 111 extends about the guide roller support strut 117 and across the guide roller 110.

FIG. 6A provides a cross sectional view of the closed electrically powered bicycle wheel assembly of FIGS. 1A-5. In FIG. 6A the powered wheel assembly 100 is illustrated removed from the bicycle fork 114 and including the tire 102 coupled to the rim 103.

Figure 6B:
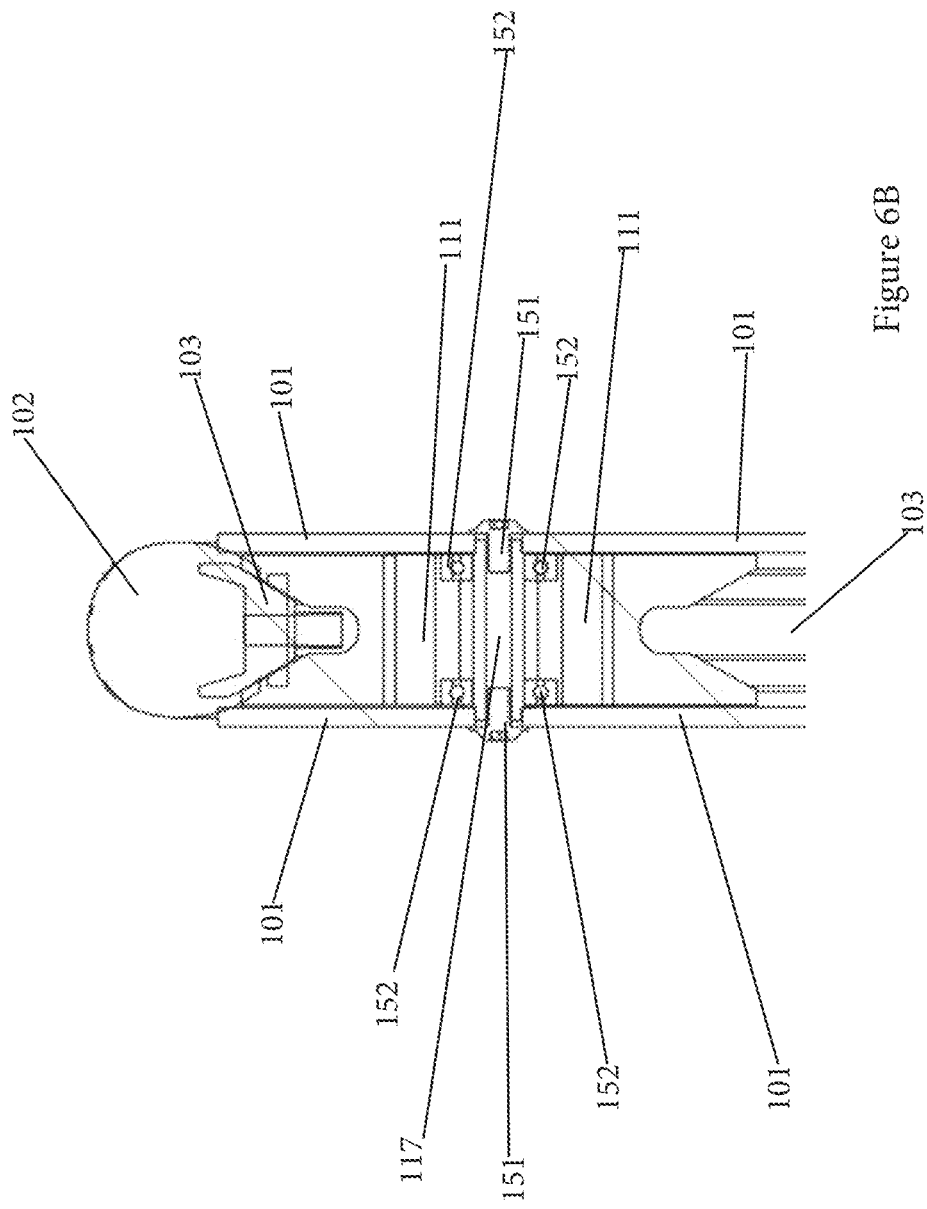
FIG. 6B provides a cross sectional view of the powered bicycle wheel assembly of FIGS. 1A-5 without O-rings.

In FIG. 6B the powered wheel assembly 100 is illustrated removed from the bicycle fork 114 and including the tire 102 coupled to the rim 103, but has the guide wheel O-rings 122 removed from the graduated grooves in the guide wheel channel 125. As demonstrated in FIG. 7A the drive roller 105 engages the rim 103 in a drive roller channel 127 to frictionally transmit rotation caused by the motor 108 to the rim 103 and thereby cause the rim 103 and the tire 102 to rotate about the hub plates 101 and about the powered wheel axle 118.

Figure 7A:
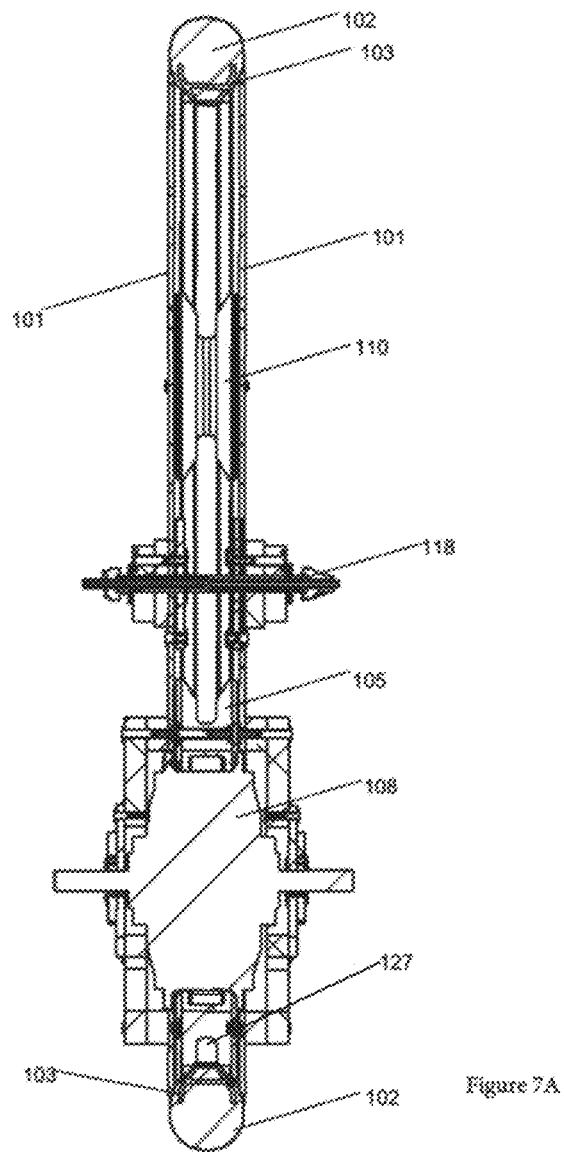
FIG. 7 A provides another cross sectional view of the closed electrically powered bicycle wheel assembly of FIGS. 1A-5 from a different angle.
FIGS. 7B and 7C illustrate the motor and drive roller of FIG. 7A removed from the powered bicycle wheel assembly of FIG. 7A.
Figure 7B:
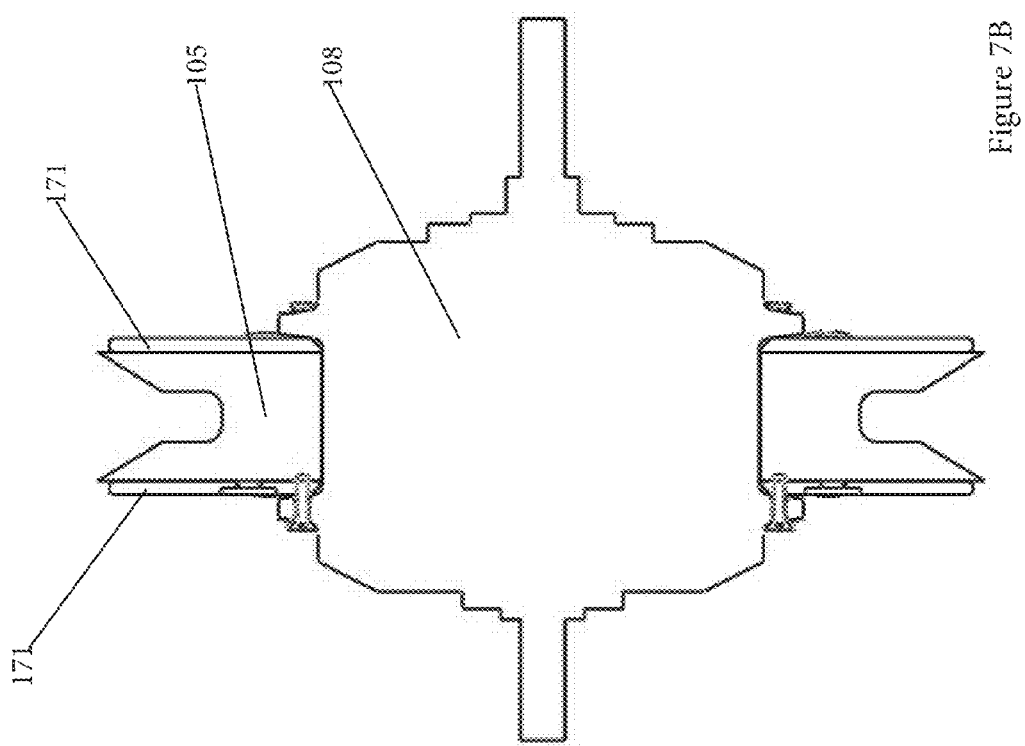
Figure 7C:
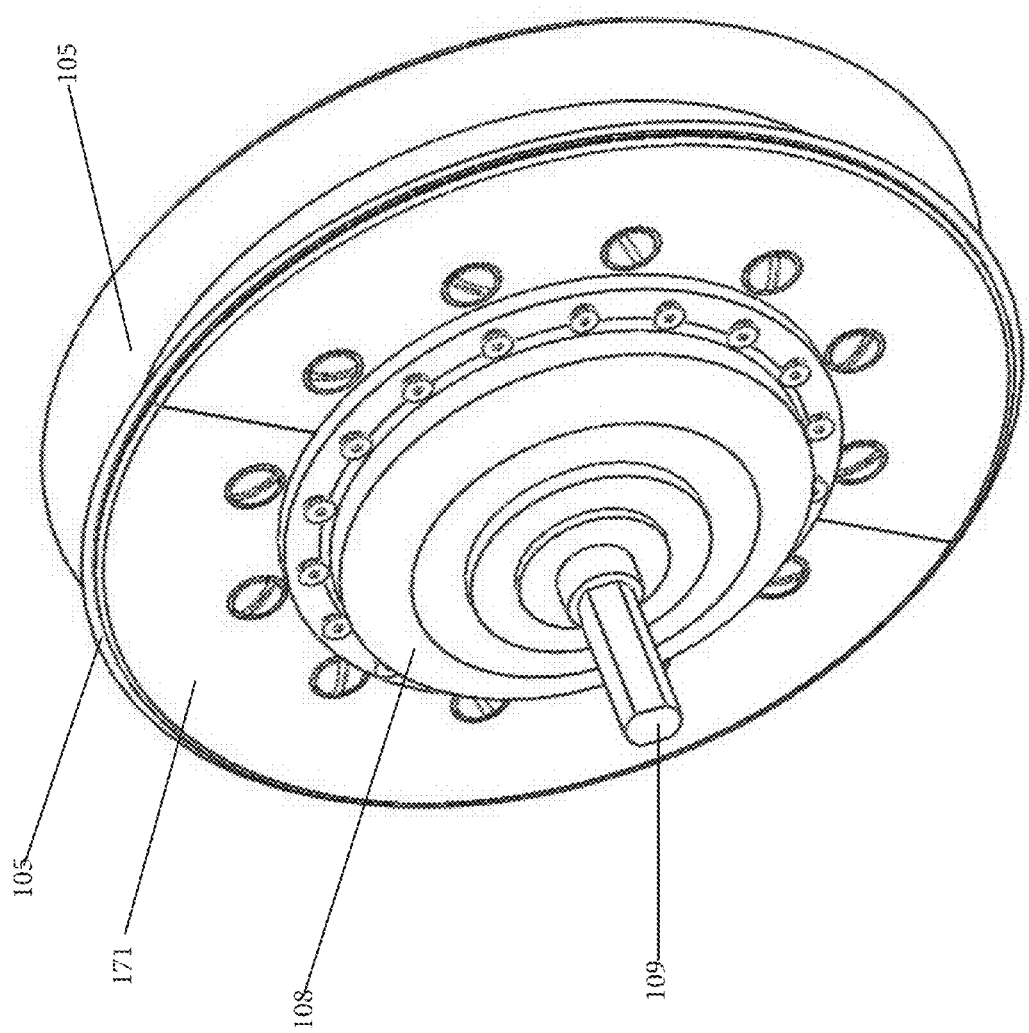

FIG. 7A provides another cross sectional view of the closed electrically powered bicycle wheel assembly of FIGS. 1A-5 from a different angle. More specifically, FIG. 7 shows the powered wheel assembly 100 cross sectioned through the drive roller 105 and the motor 108. FIGS. 7B and 7C illustrate the motor and drive roller of FIG. 7A removed from the powered bicycle wheel assembly of FIG. 7A. As demonstrated in FIGS. 7B and 7C, in example embodiments, the motor 108 is positioned within the drive roller 105, such that the drive roller 105 rotates about the motor 108. The drive roller 105 is reinforced by drive roller supports 171. The motor may be coupled to the drive roller via a transmission, for instance an internal, gear based transmission, or a belt transmission, as shown in FIG. 1H. FIGS. 7A, 7B and 7C also illustrate an embodiment where drive roller 105 and guide roller 110 have a central channel that allows passage of a valve stem. The drive and guide roller may or may not have such central channel, depending on the embodiment. Other shaped drive rollers can be used in different embodiments. In an embodiment the tire 102 is a solid tire and no air valve is included. In another embodiment, illustrated in FIG. 11, the rim has an inner and outer structure, connected to one another with one or more tensile members, as illustrated by the white and black areas of rim 103.

In an embodiment the drive roller and rim have groves and cogs, which can grip onto groves and cogs of a rim 103. FIGS. 7 and 10 illustrate different embodiments of rotatably coupled rollers and rims. In this application we use the term roller for a component that rotatably couples with another component.

Figure 8:
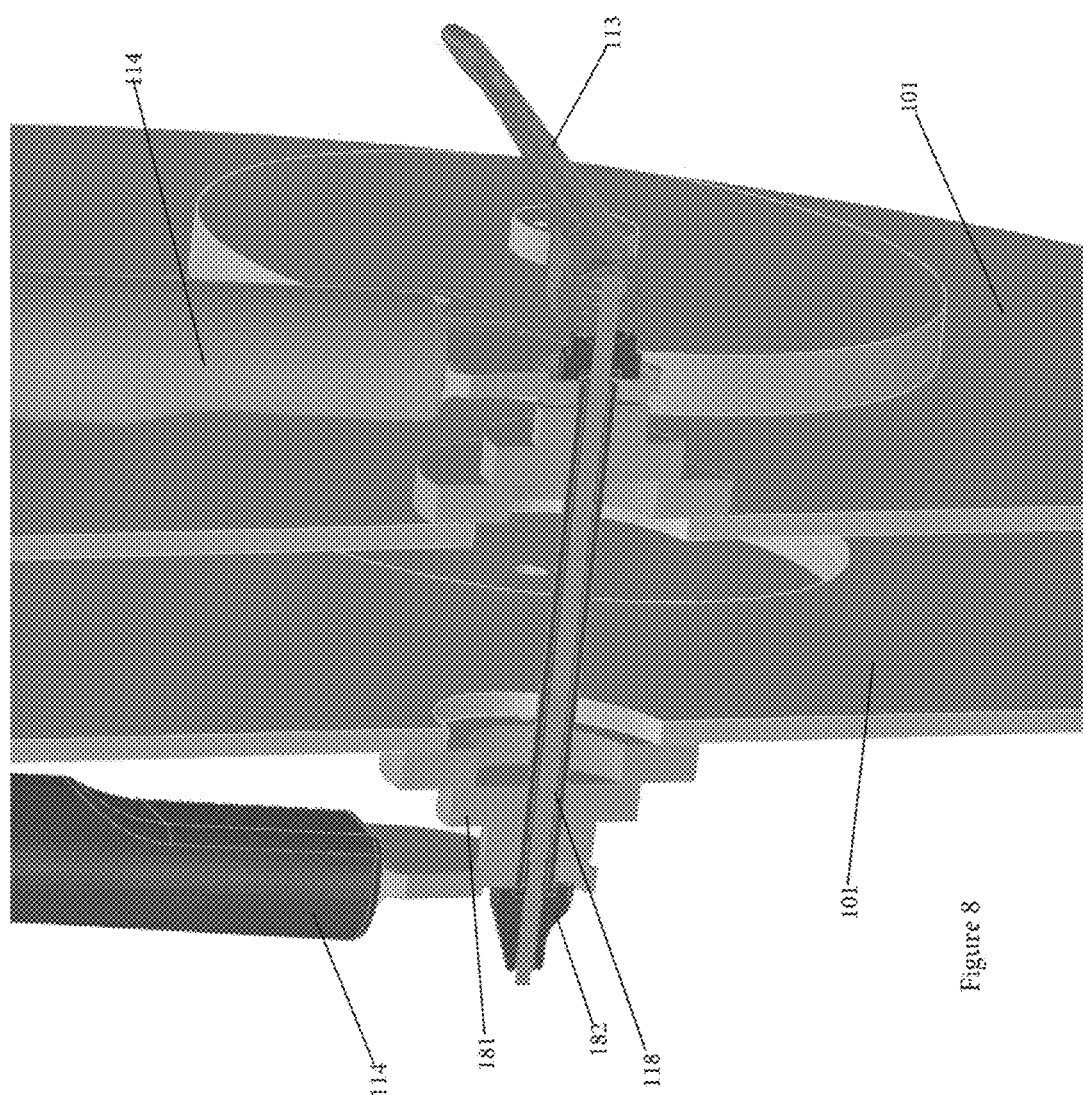
FIG. 8 is partial cross section view of a hub assembly of the powered wheel bicycle wheel assembly of FIGS. 1A-7C sectioned at the axle of the powered bicycle wheel assembly.

FIG. 8 is partial cross section view of a hub assembly of the powered wheel bicycle wheel assembly of FIGS. 1A-7 sectioned at the axle of the powered bicycle wheel assembly. As shown in FIG. 8, the powered wheel axle 118 may include one or more bushings 181 positioned between the hub plates 101 and the forks 114. The powered wheel axle 118 is coupled to the bicycle forks 114 via one or more fasteners 182 and/or quick release coupling 113.

Figure 9A:
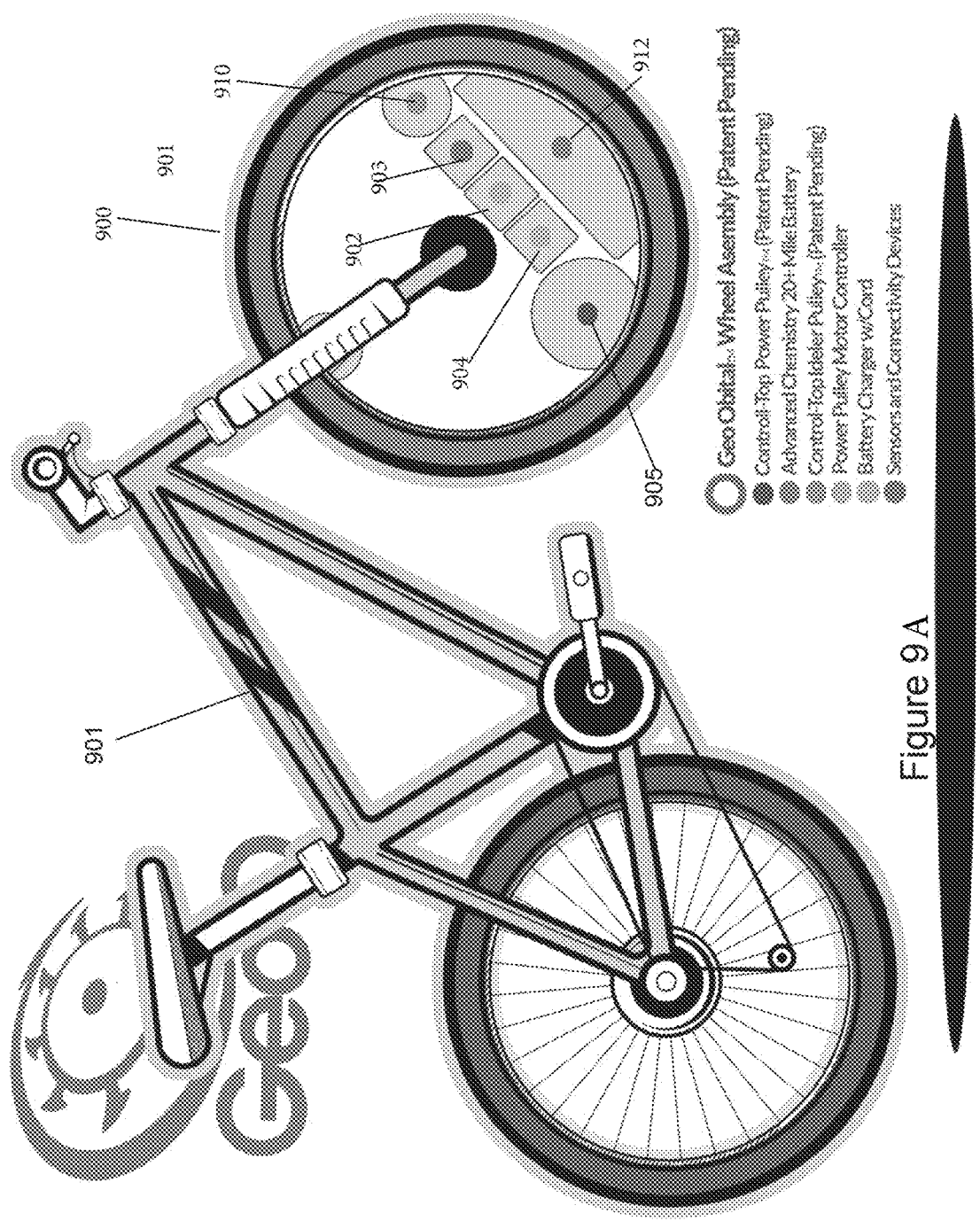
FIGS. 9A-9D show bicycles including a powered wheel assembly, in accordance with example embodiments.
Figure 9B:
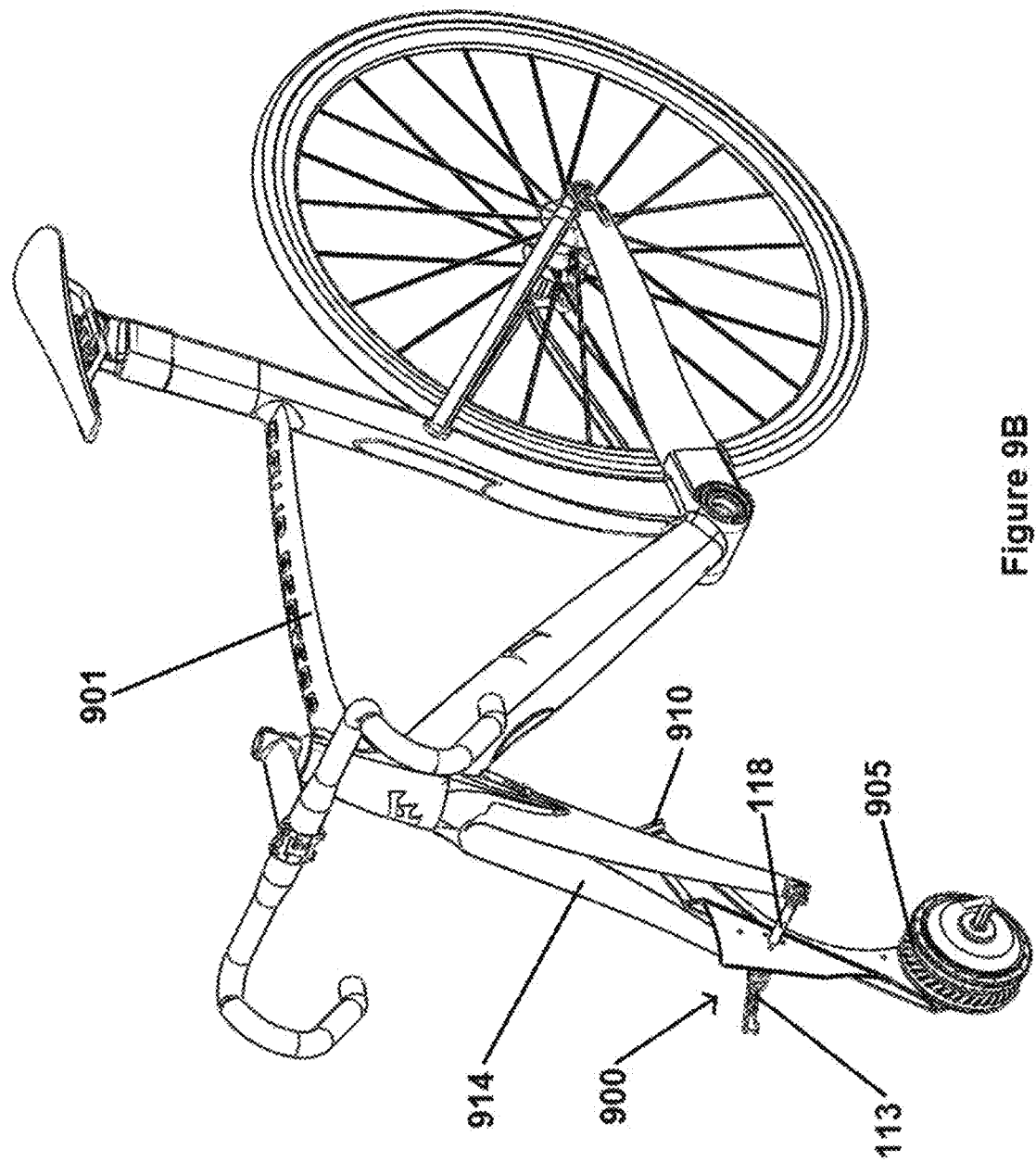
Figure 9C:
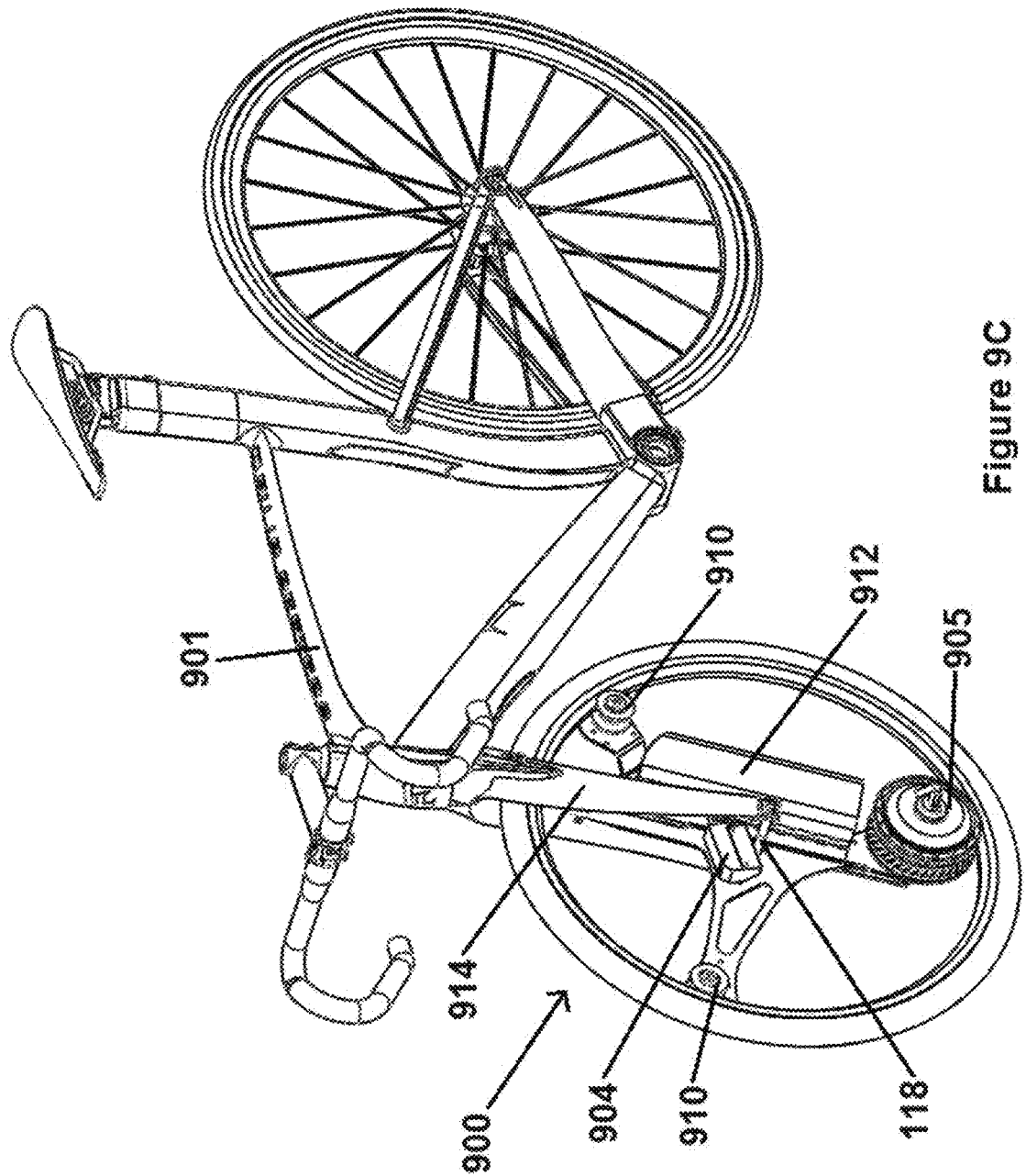
Figure 9D:
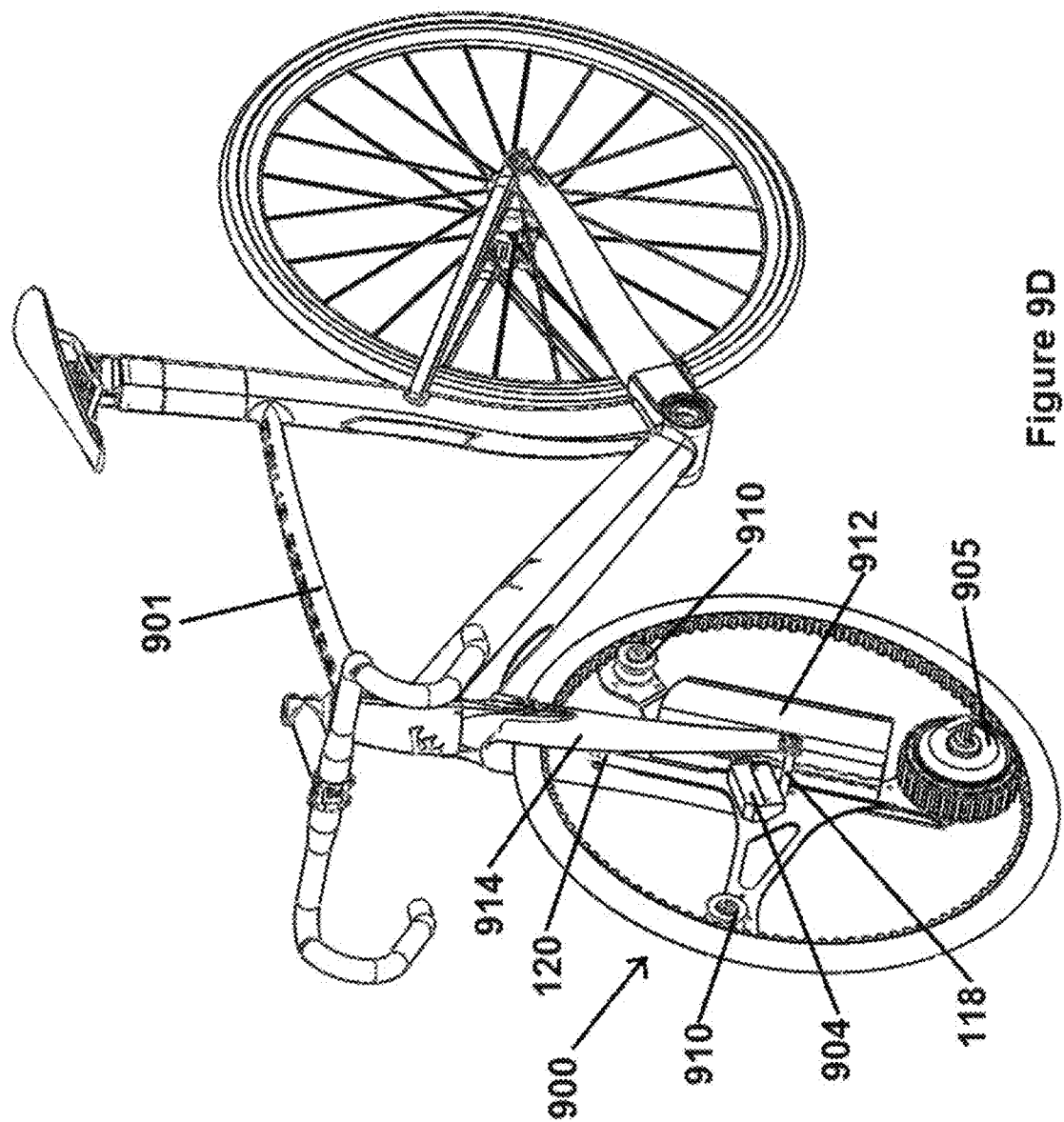

FIGS. 9A-9C illustrate a bicycle 901 including a powered wheel assembly 900 coupled to the front of the bicycle at the forks 914 of the bicycle 901. The powered wheel assembly 900 includes a power pulley or drive roller 905, housed in a hub 901. The powered wheel assembly 900 further houses a battery 912, a guide roller(s) 910 (functioning in a manner similar to an idler pulley), a controller 904, a battery charger 902 and a sensor and connectivity device 903, housed in the hub 901. In particular embodiments, the controller 904 may be programmable and configured to automate control of the drive roller 905 based on various operating conditions of the bicycle. In particular embodiments, the powered wheel assembly 900 is configured for integration of other devices and sensors configured to connect the wheel assembly 900 to a mobile device and/or the internet to transmit and/or broadcast data including, but not limited to, performance information, energy use or generation information, information about location, operating parameters, security, etc. . . . which information may be used to gamify, safeguard, and otherwise enhance a cycling experience.

FIG. 10 shows an example embodiment where a driver roller 105 and rim 103 rotatably couple using cogs and groves.

Figure 11:
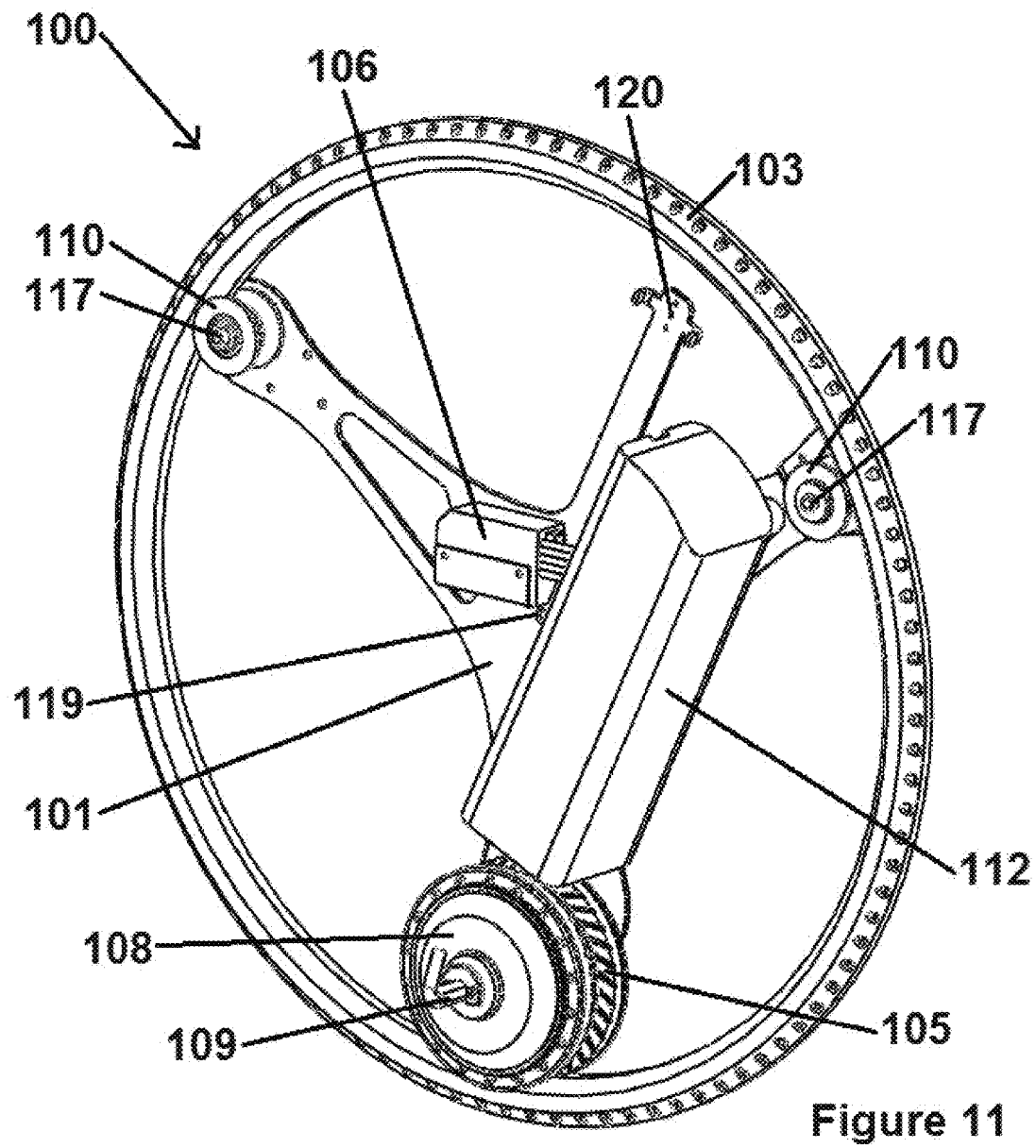
FIG. 11 shows a view of a wheel rim 103 with an inner and outer structure; connected to one another by one or more tensile members, as illustrated by the white areas in between the black areas of rim 103.

FIG. 11 shows an example rim 104 consisting of an inner and outer structure connected with tensile members as illustrated by the white and dark areas of rim 103.

FIG. 12 shows a wheel assembly including a throttle control 128 that can be mounted on a handle bar. Many other types of controls can be envisioned, such as, but not limited to: a graphic user interface on a mobile device such as a cell phone, a "peddle assist" throttle, a foot enabled throttle etc.

Figure 13A:
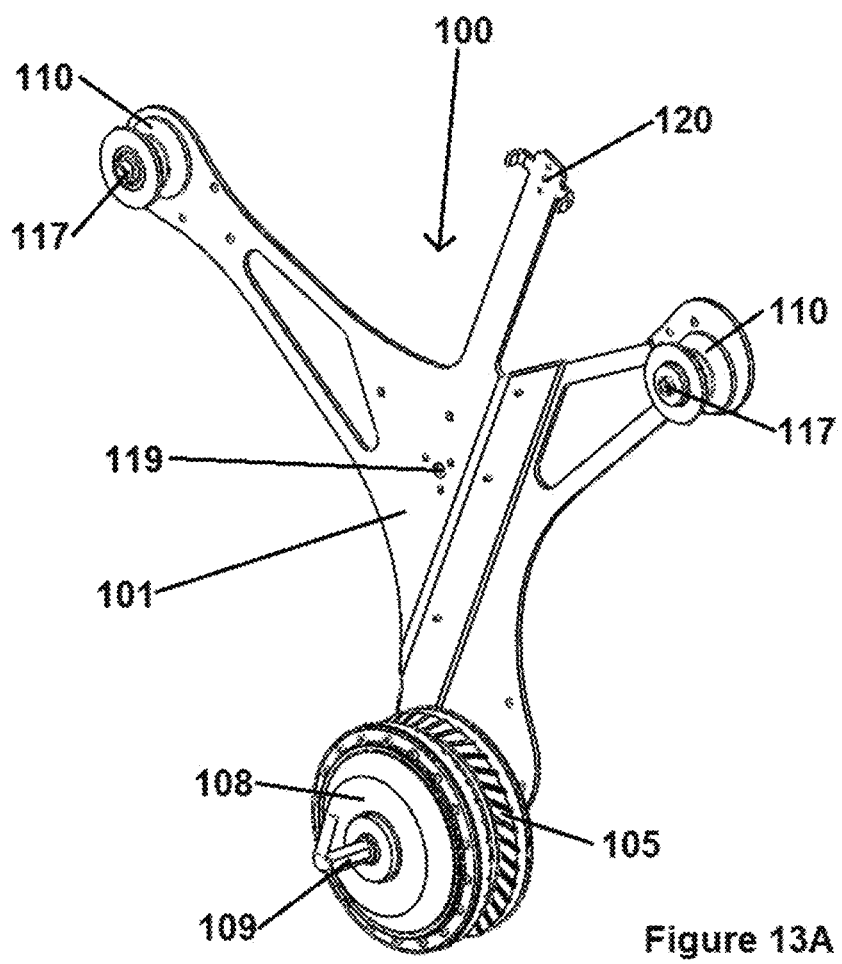
Figure 13C:
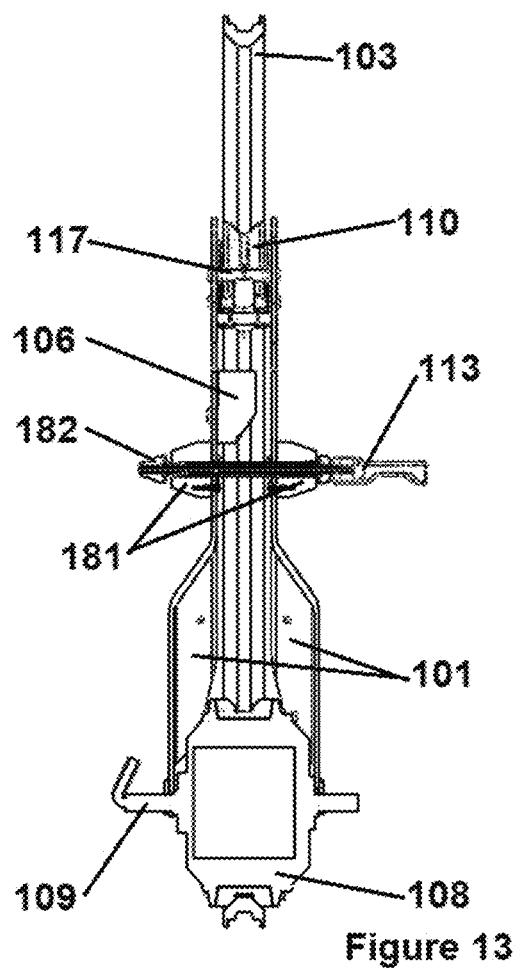
Figure 13D:
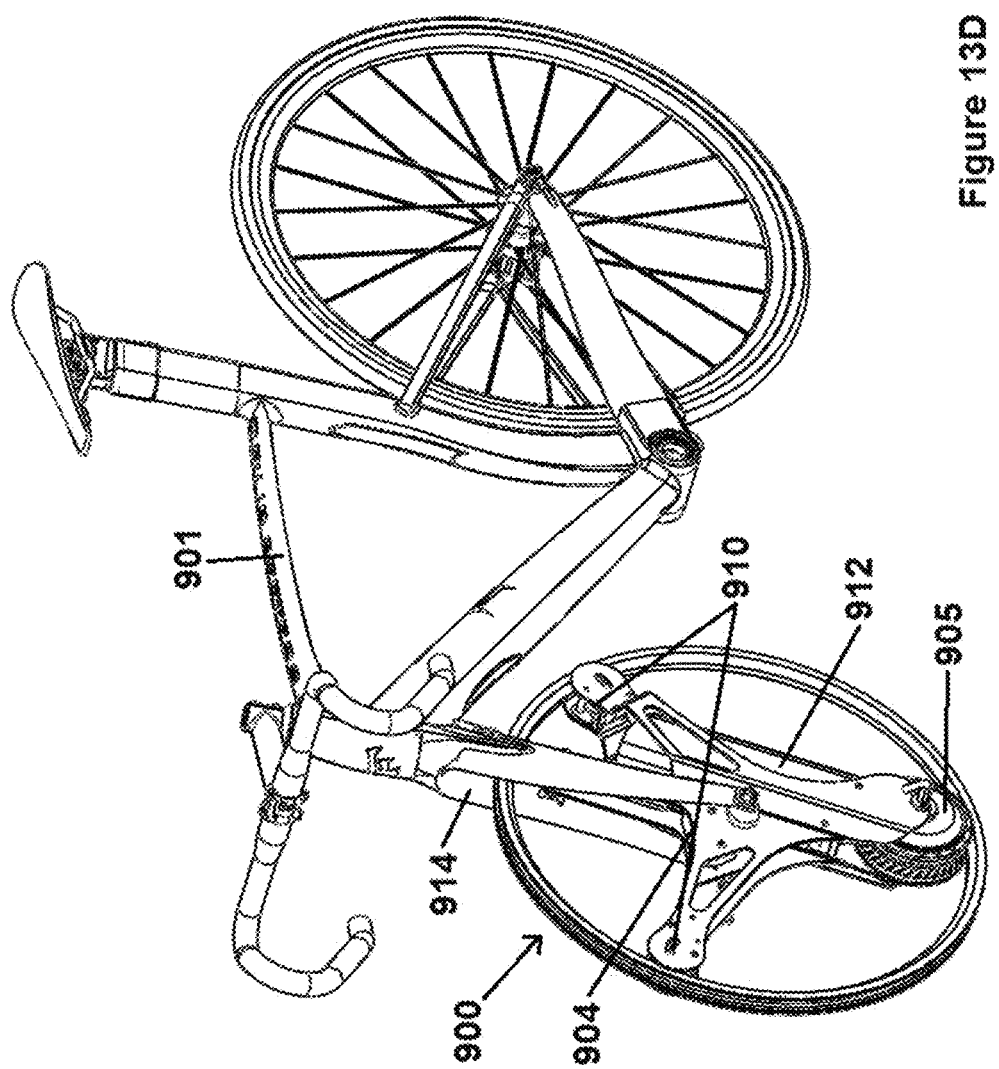
FIG. 13D shows such a wheel assembly mounted onto a bicycle.

FIG. 13A shows an example wheel assembly with one drive roller and two guide rollers. The drive roller is mounted near the bottom of the wheel assembly, which is near the point where a rim and tire would touch the ground when the assembly is mounted to a vehicle. FIG. 13B, shows a perspective view of an example wheel assembly with one drive roller, two guide rollers, a shock absorbing tensioner and a rim. FIG. 13C shows a cross section view of this assembly, and FIG. 13D shows a view of a bicycle equipped with this example wheel assembly.

Figure 14:
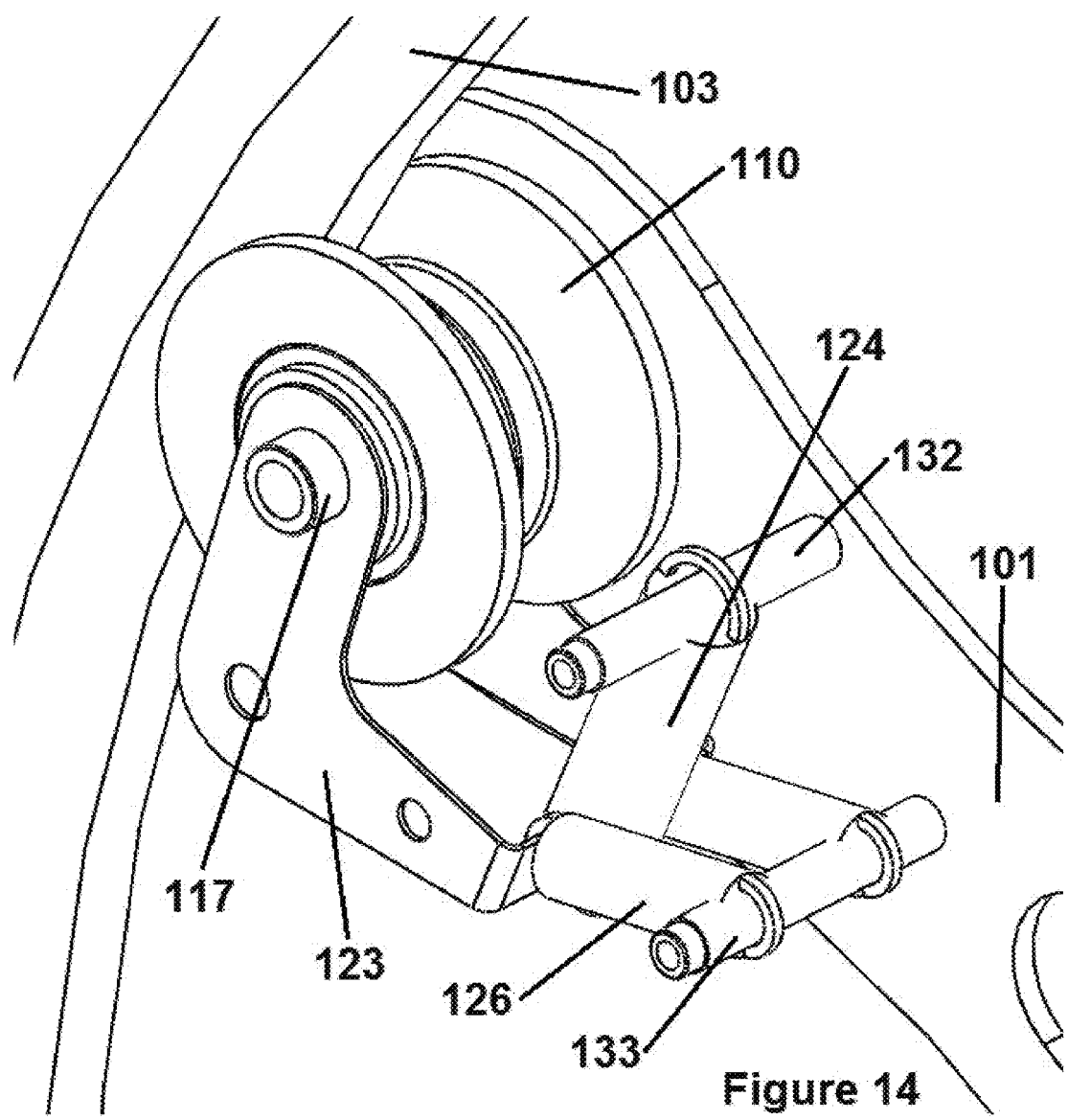
FIG. 14 shows an example embodiment of a guide roller 110 with a shock absorbing tensioner.

FIG. 14 shows an example guide roller with a shock absorbing tensioner. Such a shock absorber is useful when the wheel rim hits a road obstacle, such as a curb, or unevenness. The wheel rim can move back and forth, and the absorber will make sure that the wheel rim and guide roller remain in contact with one another, as the yoke 123 and spring loaded tensioner arms 124 and 126 pivot around their pivot points 132, 133.

Although systems and methods of the present disclosure are generally described above in connection with an application to a bicycle wheel, these systems and methods may be used in a variety of different applications, including but not limited to wheel chairs, personal mobility devices (including Segway, Taurus, WHILL, and many others), motorcycles, mopeds, scooters, automobiles, and any other powered vehicles advantageously combining a powertrain, motor, and wheel. In a particular embodiment, a vehicle is provided that includes 4 powered wheels assemblies mounted in a rectangular formation. Because the vehicle includes 4 powered wheel assemblies in accordance with example embodiments disclosed herein, the vehicle precludes the need for powertrain components in the middle of the vehicle thereby providing a platform for a foldable car stowable in extremely compact spaces while still providing the stability, safety, and environmental protection afforded by cars.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

For the purpose of this disclosure the term guide roller refers to a roller or an equivalent guide mechanism that can guide a rim with respect to the hub plates. Examples of such other guiding mechanisms can be guides that use magnetic forces, or guides that simply use friction, or rollers that are mounted differently than shown in the figures, or a set of bearings that can guide the rim etc. Guide rollers and guide mechanisms can rotatably or moveably couple with a rim.

For the purpose of this disclosure the term "rim" can refer to a structure with variable degrees of stiffness, from a tread or caterpillar to a more rigid, classical rim, as present in a regular wheel of a bicycle or other vehicle. The axis of rotation of a rim is a virtual point, which can for instance coincide with the center of gravity of the rim. For a perfectly circular rim the axis of rotation can be defined the center point of the circle. For a tread or imperfectly circular rim the axis of rotation can be defined as the center of gravity of the tread or rim. The axis of rotation of a roller can coincide with the center of gravity that roller. In example embodiments of this invention the axis of rotation of the rim and the axis of rotation of at least one of the rollers are not substantially coinciding; for instance when a roller is in direct contact with the rim, moveably or rotatably coupled, and the roller has a smaller diameter than the rim.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the specification above, all transitional phrases such as "comprising," "including," "carrying," "having," "containing," "involving," "holding," "composed of," and the like are to be understood to be open-ended, i.e., to mean including but not limited to.

It should be understood that various changes in form and detail may be made by one of ordinary skill in the art without departing from the spirit and scope of the embodiments disclosed herein.

CONCLUSION, RAMIFICATIONS AND SCOPE

The reader will see that embodiments of this disclosure are beneficial in many ways, including, but not limited to: (a) reversibly converting legacy bicycles to electrically motorized bicycles in a very easy and inexpensive way, (b) using the stationary inside space of the wheel rim as productive space for mounting different components, including energy/power supplies, controllers, motors, rollers, suspension devices, storage spaces, communication and Internet of Things Connectivity devices, electronics, tools, and safety elements, such as lights, horns etc. (c) enabling inexpensive wheel manufacturing techniques, using off the shelf components, and less strict tolerances, while maintaining rider's comfort.

What is claimed is:

1. A wheel assembly configured to rotatably couple to a rim having a first axis of rotation, said wheel assembly comprising:
   one or more hub plates;
   one or more guide mechanisms, mounted to said one or more hub plates, the one or more guide mechanisms configured to guide the rim relative to the one or more hub plates; and
   a drive assembly mounted to said one or more hub plates, the drive assembly including a drive roller and a motor located within the drive roller, the motor configured to provide power to rotate the drive roller with the drive roller rotatably coupled to the rim,
   wherein the drive assembly includes an axle having a fixed rotational position and providing a second axis of rotation about which the drive roller and the motor rotate, and wherein the first axis of rotation and the second axis of rotation are substantially parallel but different axes of rotation.

2. The wheel assembly of claim 1, further comprising one or more energy supplies removably coupled to the one or more hub plates, the one or more energy supplies configured to remove and reinstall with the wheel assembly rotatably coupled to the rim.

3. The wheel assembly of claim 2, further comprising one or more controllers, said controllers electrically coupled to the motor and said one or more energy supplies, and said controllers capable of a regulation of power input to said motor, the regulation including a regulation that provides a regenerative braking of said motor,
wherein the motor is directly coupled to the drive roller.

4. The wheel assembly of claim 3, wherein said controller is configured to offset an inherent resistance of the wheel assembly.

5. The wheel assembly of claim 3, further comprising a user interface, for configuring said one or more controllers for regulating the power input to said motor.

6. The wheel assembly of claim 1, further comprising:
a rim configured to rotatably couple to the wheel assembly.

7. The wheel assembly of claim 6, wherein said drive roller is rotatably coupled with said rim using friction.

8. A vehicle including the wheel assembly as claimed in claim 7, the wheel assembly rotatably coupled to the rim and the rim mounted on the vehicle.

9. The vehicle of claim 8, wherein the wheel assembly is configured to locate the drive roller substantially vertically below the first axis of rotation.

10. The wheel assembly of claim 1, wherein at least one of the one or more guide mechanisms includes a guide roller including a shock absorbing tensioner.

11. The wheel assembly of claim 1,
wherein the one or more guide mechanisms include two guide mechanisms each guide mechanism including a single roller, respectively.

12. The wheel assembly of claim 1, wherein at least one of said one or more guide mechanisms includes a roller configured to provide lateral support to said rim.

13. The wheel assembly of claim 1, wherein the one or more hub plates include through-holes.

14. A wheel assembly configured to rotatably couple to a rim having an axis of rotation and a first plane of symmetry perpendicular to the axis of rotation, said wheel assembly comprising:
a hub having a second plane of symmetry substantially coincident to the first plane of symmetry with the wheel assembly coupled to the rim, the hub including:
a first arm extending radially outward in a first direction relative to the axis of rotation with the wheel assembly coupled to the rim; and
a second arm extending radially outward in a second direction relative to the axis of rotation with the wheel assembly coupled to the rim;
at least one guide mechanism located at a distal end of the first arm; and
a combined motor and drive roller assembly located at a distal end of the second arm, the combined motor and drive roller assembly including an axle about which the motor and drive roller assembly rotate with electrical power supplied to the motor and drive roller assembly, the axle coupled to the hub and having a fixed rotational position,
wherein the combined motor and drive roller assembly is positioned to rotatably engage the rim with the wheel assembly rotatably coupled to the rim.

15. The wheel assembly of claim 14, further comprising a power supply electrically coupled to the combined motor and drive roller assembly.

16. The wheel assembly of claim 15, wherein the power supply is configured to remove and reinstall with the wheel assembly rotatably coupled to the rim.

17. The wheel assembly of claim 16, further comprising a controller electrically coupled to the combined motor and driver roller assembly,
wherein a motor included in the combined motor and drive roller assembly and a drive roller included in the combined motor and drive roller assembly are directly coupled to one another, and
wherein the controller is configured to regulate an operation of the wheel assembly such that regenerative power is supplied to the power supply by the motor during a braking operation of the wheel assembly.

18. The wheel assembly of claim 17, wherein the power supply includes a central longitudinal axis, and
wherein the central longitudinal axis is coincident with the second plane of symmetry with the power supply installed on the wheel assembly.

19. The wheel assembly of claim 18, wherein the hub includes at least two hub plates,
wherein the hub includes a first aperture configured to secure the combined motor and drive roller assembly in a fixed position with respect to the hub, the first aperture including a first region located between the at least two hub plates, and
wherein the hub includes a second aperture configured to receive the power supply in a location that does not interfere with an operation of the wheel assembly with the wheel assembly rotatably coupled to the rim, the second aperture including a second region located between the at least two hub plates.

20. The wheel assembly of claim 19, further comprising an electrical outlet electrically coupled to the power supply.

* * * * *